(12) United States Patent
Rizzi

(10) Patent No.: US 11,715,367 B2
(45) Date of Patent: Aug. 1, 2023

(54) MANAGEMENT SYSTEM FOR MANAGING A SET OF ELECTRICAL DEVICES

(71) Applicant: SELPRO SRL, Bagnolo Mella (IT)

(72) Inventor: Stefano Rizzi, Brescia (IT)

(73) Assignee: SELPRO SRL, Bagnolo Mella (IT)

( * ) Notice: Subject to any disclaimer, the term of this patent is extended or adjusted under 35 U.S.C. 154(b) by 0 days.

(21) Appl. No.: 17/205,516

(22) Filed: Mar. 18, 2021

(65) Prior Publication Data

US 2021/0295679 A1 Sep. 23, 2021

(30) Foreign Application Priority Data

Mar. 19, 2020 (IT) .................. 102020000005878

(51) Int. Cl.
*G08C 15/08* (2006.01)
*F24F 7/06* (2006.01)
(Continued)

(52) U.S. Cl.
CPC .............. *G08C 15/08* (2013.01); *F24F 7/06* (2013.01); *G05B 19/056* (2013.01);
(Continued)

(58) Field of Classification Search
CPC ......... G08C 15/08; G08B 25/018; F24F 7/06; G05B 19/056; G05B 19/058
(Continued)

(56) References Cited

U.S. PATENT DOCUMENTS

| 2003/0198018 | A1* | 10/2003 | Cipolla | ................. H04L 7/0338 |
| | | | | 361/679.48 |
| 2007/0194728 | A1* | 8/2007 | Beifus | ................. G05B 19/0423 |
| | | | | 318/66 |

(Continued)

FOREIGN PATENT DOCUMENTS

| EP | 2168903 A1 | 3/2010 |
| IT | BO20120220 A1 | 10/2013 |

OTHER PUBLICATIONS

Bison ProFab, Bison ProFab Industrial Enclosures (screenshot), Aug. 27, 2018, wayback machine screen capture (Year: 2018).*

(Continued)

*Primary Examiner* — Robert E Fennema
*Assistant Examiner* — Christopher W Carter
(74) *Attorney, Agent, or Firm* — Lucas & Mercanti, LLP

(57) ABSTRACT

A system is disclosed for managing a set of electrical/electronic devices for driving fans of a heat exchanger of a refrigeration plant, having a basic control unit adapted to act as interface between a remote control unit/Master unit and a plurality of electrical/electronic devices to be controlled. The basic control unit has a data input to receive inputs from the remote control unit/Master unit and a plurality of data outputs connectable with respective electrical/electronic devices of the electrical/electronic devices. The basic control unit is configured to address the electrical/electronic devices using management signals to program the operating parameters of the electrical/electronic devices, and to directly manage the operation. The management signals
(Continued)

include addressing, programming and management commands previously programmed in the memory unit based on specific applications and communication protocols. The basic control unit manages the data outputs independently from the other data outputs, to manage the electrical/electronic devices independently.

13 Claims, 16 Drawing Sheets

(51) Int. Cl.
  *G05B 19/05* (2006.01)
  *G08B 25/01* (2006.01)
  *G05B 19/414* (2006.01)
  *H04L 12/40* (2006.01)

(52) U.S. Cl.
  CPC ......... *G05B 19/058* (2013.01); *G05B 19/414* (2013.01); *G08B 25/018* (2013.01); *G05B 2219/1125* (2013.01); *G05B 2219/15006* (2013.01); *H04L 2012/40228* (2013.01)

(58) Field of Classification Search
  USPC .......................................................... 700/19
  See application file for complete search history.

(56) References Cited

U.S. PATENT DOCUMENTS

| | | | |
|---|---|---|---|
| 2014/0132185 A1 | 5/2014 | Skinner | |
| 2016/0179723 A1* | 6/2016 | Kishi | G06F 13/4068 710/113 |
| 2019/0036728 A1* | 1/2019 | Hu | H02J 7/0068 |
| 2020/0248923 A1* | 8/2020 | Snider | F24F 11/77 |

OTHER PUBLICATIONS

Italian Search Report for Italian Application No. IT 202000005878 (2 Pages) (dated Dec. 3, 2020).

* cited by examiner

MANAGEMENT SYSTEM FOR MANAGING A SET OF ELECTRICAL DEVICES

CROSS-REFERENCE TO RELATED APPLICATIONS

This application claims the benefit of priority from Italian patent application No. 102020000005878 filed on Mar. 19, 2020, the contents of which are incorporated herein by reference.

FIELD OF THE APPLICATION

The present disclosure relates to a system for managing a set of electrical/electronic devices which are used for the management of a system in various installation, positioning and/or regulation applications. Motors are an example of these devices, in particular electronically commutated (EC) motors applied to fans of various types and sizes. For instance, the present disclosure applies to EC motors for the control of fans of ventilated heat exchanger. The following description is made with reference to this application field with the only purpose of simplifying the exposition thereof.

BACKGROUND OF THE INVENTION

As it is well known, in order to obtain a correct and optimal operation of a refrigeration equipment, it is necessary to provide the plant with a suitable instrumentation to manage and dissipate the heat generated, such as for instance to provide the plant with ventilated heat exchangers. Generally, the ventilated heat exchangers are manufactured based on a special technical-industrial project, aimed both at maximizing the constructive efficiency of the ventilating machine and at ensuring energy savings.

In the design of the ventilated heat exchangers, such as for instance the system depicted in FIG. 1, electric motors (for instance AC motors) are used to drive the fans. There are also electronic commutation motors (the so-called EC motors), which are nowadays used in the design of the ventilated heat exchangers; thanks to the EC motors, it is possible to express all the potentialities and energy saving capabilities for which the exchanger was designed.

The electric motors are applied to different types of fans (such as for instance axial-radial-centrifugal fans) and are designed to be managed by a command signal, namely by a specific regulation command, which generally may be a hardware command, such as for instance a voltage command of the 0-10 Vdc type, or they may be suitably managed through a software command, such as for instance the Modbus protocol.

In the specific case of the EC motors, the 0-10 V command allows a simple regulation, for instance by adjusting the fan speed of the needs of the system. The 0-10 V regulation simplifies the problems of installation, connection, and commissioning of the fan system; however, the use of this regulation only reduces the functional potential of the EC motors. With the 0-10 V regulation alone, it is not possible to access the special working functions offered by these EC motors, nor, above all, to receive information relating to their operation. For this reason, the single EC motors must be addressed and/or programmed in advance.

To make the interaction between the management system (which may be local or remote) and the ventilated heat exchanger efficient and effective, a Modbus connection is used. Only through the Modbus connection is it possible first of all to address the EC motor and then to program the working parameters in order to manage all the functions that the EC motor makes available.

The EC motor is generally managed by a local or remote Master device, which controls its functions and enables the motors to precisely perform all the expected operations.

The aforementioned Modbus protocol is still nowadays one of the most popular communication protocols in the industrial automation field since it is a simple, direct, and royalty-free protocol. The simple and essential structure of the transmitted data allows an effective communication with an excellent ratio between the payload and the total number of bytes transmitted. The Modbus protocol is suitable for the exchange of information between physically distinct devices that may be positioned even at considerable distances from each other, even using commercial devices made by different manufacturers and easily replaceable.

Generally, the different components and the single controlled devices are connected to each other in the so-called "Daisy-Chain" mode, namely in series one after the other, by means of specialized cables and with few conductor poles, to form a distributed network even over long distances. In this way, the connection of the differential line to the various devices to be controlled is performed by following a single linear path without branches, as illustrated in FIG. 2.

It is generally required that the conductors are not mixed with power cables and that certified cables suitable for the correct transmission of information are used for the connections. Indeed, the quality of the electrical connections determines the quality and stability of the command, programming and management signals of the devices connected to the Modbus network and is a fundamental prerequisite for obtaining maximum system performance.

In particular, in the diagram of the Modbus network, it is important to adopt specific measures to ensure that no noise is added to the carried signals and that these signals are not distorted or reflected. For instance, it is possible to use cables with the pair of conductors closely intertwined, as well as to use appropriate termination resistors, in particular at the ends of the line so as to have a correct termination of both the electrical impedance value and the differential line.

For all the aforementioned reasons, in order to ensure an optimal system operation, it is very important to pay attention to the electric connections, so that the installation by the operator is often long and difficult and it is necessary to resort to specialized operators for this operation.

Another common problem relates to the safety of the operators. In particular, once the mechanical construction of a ventilated exchanger has been completed and the electrical components necessary for its operation have been installed, the programming and testing procedures of the motors must be addressed, at the same time respecting all of the safety standards.

In particular, as above indicated, once the power connections of the power supplies of the EC motors have been completed, in order to manage the fan unit of the principles of Industry 4.0 it is necessary to address and program all of the motors of the fan unit. According to the known solutions, each motor is programmed individually, according to a procedure that is carried out and must be validated with the motor powered at the mains voltage, which may be both single-phase and three-phase. In order to proceed with the programming of the motors, it is therefore required to perform some operations, among which the opening of the electrical wiring box of the motor, the connection between a programming unit and the motors and the use of said unit when the motor is powered with the mains voltage. This procedure has therefore many critical issues and safety problems, in addition to the long technical times to complete the programming procedures of the single EC motors.

Moreover, there are cases in which the motor is not equipped with an ON-OFF switch, so that, during programming, all the connected motors must be powered simultaneously. Furthermore, it is known that an EC motor has an internal inverter, which, even if switched off, maintains a parasitic voltage on the terminals of the power supply conductors in the electrical wiring box, to which it is necessary to pay close attention and wait for the necessary time before to proceed with the disconnection of the programmed motor and to pass to the next one to be programmed.

In addition to electrical safety, mechanical safety must also be considered for the operator who is in charge for programming the EC motors. For instance, in case of an EC motor connected and powered with the mains voltage, if there are transient disturbances that are collected by the power line, it is possible that parasitic voltages generate a command that causes the impeller to rotate, even at maximum speed, which can also happen when the operator is working on the fan motor, with considerable risks for his safety. It is therefore desirable that the programming and testing operations are carried out by the operator in a safe area.

According to the known solutions, it is important to be able to switch the motors on and off individually (which in any case does not guarantee total safety for the operator, as seen above), as well as it is important and necessary that there is collaboration between at least two operators, and there is still the need for technical solutions able to simplify the procedures, able to easily discover the connection and programming problems of the EC motors, able to allow a documentary feedback with the acquisition of the programmed parameters, able to generate a report of the technical data of the EC motors of the ventilating machine, and able to effectively ensure the safety during all the operations on a machine or plant.

It is also noted that, in the event of a malfunction of one or more motors, the defective components may generate a failure of the entire fan system, blocking its operation. Moreover, the known solutions do not allow easy replacement and automatic reprogramming of the motor, as well as in general do not allow easy installation and commissioning of the system.

To sum up, nowadays the electrical connections of a ventilated heat exchanger are made according to the specific technical-functional needs of the regulation system present on the plant. During the testing operations of the EC motors, the operator is expected to proceed with the programming of the motors, which is carried out and completed with the VAC power supply fed in the motor. Generally, the motors are programmed individually, and the EC motor unit is addressed only through dedicated wiring. At the end of the test, the operator writes a report that summarizes the data and the work parameters programmed on the motors, but no other test and/or comparison is made on the motors present on the fan machine in order to verify the homogeneity and correctness of the motor codes and of the programmed parameters, as well as no automatic report summarizing the activity performed is generated, and some important information may be omitted by mistake.

During service operations, maintenance and/or replacement interventions must generally be carried out without causing the system to stop, making it difficult to program the replaced motors, whereas during the retrofit and updating operations of the fan unit of a heat exchanger, the problems can be several because the installation activities involve both a dedicated wiring and the programming of the EC motors, which, according to the known solution, must be carried out only by specialized technicians and specific equipment.

It is therefore evident that the known solutions are characterized by many problems and drawbacks that hinder the effective application of new technologies that would allow great efficiency and energy savings.

Therefore, it is desirable to provide a single system for managing a set of electrical/electronic devices, such as EC motors, which has structural and functional features such as to overcome the limitations and drawbacks of the prior art, in particular which allows a simplified, more functional and more effective management of a set of electrical/electronic devices, while ensuring an increased safety for the operators.

SUMMARY OF THE INVENTION

The present disclosure provides a modular basic control unit being an interface between a remote control unit/Master unit and a set of electrical/electronic devices, such as electric motors, in particular EC motors, to be controlled and managed, said modular unit acting as an addressing and programming unit for said EC motors. In this way, the disclosed system makes the commissioning and management of an advanced system, such as a heat exchanger equipped with a plurality of motors, for instance designed for Industry 4.0, unique, efficient and safe, since the basic modular control unit, with interface function, is able to easily communicate with the control system and with the motors and is suitably configured with integrated management protocols that allow an immediate installation thereof and effective addressing and management of the motors. The improved communication with the motors, as allowed by the modular basic control unit, further allows to organize the data and information on the motors and their operation and to generate, through said basic control unit, a report on the status of the system. In the case of a large number of motors to be controlled, the present disclosure provides for simply connecting multiple modular units in series, all connections being standardized and extremely simple to make. The modular units are plug & play so that their operational features are easily activated without complicated installation procedures.

A modular system, hardware and software, is therefore provided, which system easily manages the automatic programming of the EC motors of single-phase and three-phase fans, simplifies the Modbus management of the Master, which may be local or remote, (for instance by converting the standard Modbus protocol into the operating Modbus protocol as defined by the manufacturer) thanks to the presence of integrated Modbus protocols, such as for instance ebm-papst and/or ziehl-abegg protocols integrated in the basic control unit, in particular suitably programmed and stored in said basic control unit. In this way, also a Master with standard Modbus is able to manage a system with all the benefits of the operating Modbus protocols such as ebm-papst and ziehl-abegg.

The system also guarantees extremely short times in the installation, programming and commissioning phases, and the total safety of the operator both in the testing and service phases and keeps the fan system operational even in the event of hardware and/or software anomalies in the single motors (such as, for instance, an anomaly in the Modbus network), thereby solving all the connection and programming problems of systems having EC motors.

Obviously the above may also be applied to many other electrical/electronic devices, including also electrical/electronic actuators, to be controlled. It is therefore clear that the present disclosure is not limited to a particular application.

More in particular, an exemplary system for managing a set of electrical and/or electronic devices, for instance motors for driving fans of a refrigeration plant, comprises at least one basic control unit adapted to act as interface (and also as a converter element) between a remote control unit/Master unit and a plurality of electrical devices to be controlled, said basic control unit comprising at least one data input to receive input commands from the remote control unit/Master unit and a plurality of data outputs connectable with respective electrical/electronic devices of the plurality of electrical/electronic devices, wherein the basic control unit comprises a memory unit including program instructions to transform the input commands from the remote control unit/Master unit into management signals to be output through the data outputs for the plurality of electrical electrical/electronic. Through said management signals, the basic control unit is configured to automatically address the electrical/electronic devices, automatically program the operating parameters of said electrical/electronic devices, and directly manage the operation of said electrical/electronic devices, wherein the management signals comprise addressing, programming and management commands previously programmed into the memory unit based on specific applications and communication protocols of the electrical/electronic devices. The basic control unit is configured to make the program instructions activatable upon connection with the remote control unit/Master unit for the above operations of addressing, programming and managing the electrical/electronic devices. Moreover, the basic control unit is configured to manage each of the data outputs independently from the other data outputs, so as to independently manage the electrical/electronic devices. Through said program instructions, the basic control unit is configured to transform the inputs so that the management signals emitted by the data outputs are based on one (or more) operating Modbus protocols for communicating with the electrical/electronic devices, said operating Modbus protocols being defined and stored in the memory unit based on the expected communication protocol (for instance defined by the manufacturer) for the electrical/electronic device to be controlled.

The system of the present disclosure is able to control multiple devices having respective different operating Modbus protocols (for instance, one device may be managed based on a specific operating Modbus protocol and another different device may be managed based on another stored operating Modbus protocol), wherein said operating Modbus protocols are contained in the memory unit of the basic control unit; it is also possible a case in which a single Modbus protocol is used for all the devices to be controlled, depending on the circumstances and specific applications.

As it will be seen later, the basic control unit is also configured to collect and transmit information on the managed system, as well as, optionally, to directly manage the power supply of the electrical/electronic devices.

This applies both to electric motors and actuators as well as to many other electrical/electronic devices, as it will be described later.

Suitably, as seen above, the basic control unit is configured so as to be plug & play, the program instructions being activatable, or available, upon connection with the remote control unit/Master unit, wherein the devices are automatically programmed with the system activation.

More particularly, the disclosure comprises the following additional and optional features, taken individually or in combination if necessary.

In an embodiment, the basic control unit is configured to simultaneously send said management signals to two or more of devices for the simultaneous execution of said addressing, programming and management operations.

Suitably, there is no longer the need to perform single and specific programming operations for each single motor to be managed, also thanks to the modularity of the wiring, as it will be disclosed in the following. Thanks to the present disclosure, a single system is able to address, program and manage a plurality of device (such as motors), using, in its general version, a single basic control unit and connection cables, and possibly multiples thereof. A single basic control unit is therefore capable of autonomously managing a plurality of motors, even different from each other, without being limited by a particular application. The modularity of the system allows making this management unique.

According to an advantageous aspect of the present disclosure, the basic control unit may be a modular element interfaceable to other basic control units, each basic control unit being adapted to control a respective plurality of electrical/electronic devices, the system comprising a plurality of basic control units which form a set of modules connected to each other, each of said basic control units comprising a specific output and an input for connection with the other modules.

According to a preferred aspect of the present disclosure, the electrical/electronic devices are electric motors, more preferably EC motors.

According to an aspect of the present disclosure, the management signals emitted by the data outputs may comprise an adjustment analog voltage command of the type from 0 to 10 V dc, said command being at least adapted to adjust the rotational speed of the electric motors.

As mentioned, the management signals emitted by the data outputs comprise command instructions for the electrical/electronic devices based on the Modbus protocol, in particular the operating Modbus protocol as defined by the manufacturer of the devices.

In an example, the basic control unit is configured to read standard Modbus commands from the remote control unit/Master unit and to emit the management signals based on the operating Modbus, without the operator intervention. In this way, the command instructions are based on specific operating Modbus protocols as defined by specific manufacturers of the electrical/electronic devices, said protocols being previously stored and contained in the memory unit of the basic control unit. Still more particularly, in the case of electric motors (and preferably EC motors), said operating Modbus protocols may comprise at least the ebm-papst protocol and/or the ziehl-abegg protocol, said protocols being contained in the memory unit of the basic control unit (as said earlier, the protocols of other manufacturers may obviously be used, and the present disclosure is not limited by a specific Modbus protocol).

Moreover, it is possible to use the Modbus protocol to communicate with one device (as disclosed above), and another communication protocol to communicate with another device.

In other less preferred embodiments, the Modbus protocol is not used, but the management signals emitted by the data outputs may comprise command instructions for the electrical/electronic devices based on other industrial communication and management protocols.

According to another aspect of the present disclosure, the basic control unit may further be configured to convert an analog voltage regulation command of the type from 0 to 10 V dc emitted by the remote control unit/Master unit into a Modbus command (e.g., the operating Modbus protocol) to the electrical/electronic devices.

As mentioned above, the operating Modbus protocols are stored in the memory unit of the basic control unit and are defined by the manufacturers of the electrical/electronic devices.

According to another aspect of the present disclosure, the basic control unit may further be configured to read, by means of the data outputs, data from one or more of the electrical/electronic devices, use said data to generate an information package in relation to the operational status of said electrical/electronic devices and make said information available for the remote control unit/Master unit. In this way, the basic control unit is suitably configured to collect and transmit said information.

According to another aspect of the present disclosure, the basic control unit may be configured to manage a warning system which includes at least one of a signalling led, an alarm relay, and an alarm codes signalling via Modbus protocol.

Furthermore, the system of the present disclosure may comprise an auxiliary unit that is operatively connected to the basic control unit and configured at least to provide power to said basic control unit.

According to another aspect of the present disclosure, the basic control unit may comprise four data outputs for the automatic and independent management of four devices. In addition, or alternatively, the basic control unit may comprise a casing enclosing electronic components of the system, said casing having an IP degree of protection from IP20 to IP55.

In an embodiment, the casing comprises passages for housing cables for the connection to the electrical/electronic devices and/or to further basic control units and/or to auxiliary units. In a particularly advantageous embodiment, the cables are standardized. More particularly, in an advantageous embodiment, the system comprises cables for connecting the basic control unit to the electrical/electronic devices and/or to further basic control units and/or to auxiliary units, said cables being standardized (namely, being always the same for each specific function) and configured at least to carry the inputs to the basic control unit and/or the management signals to the electrical/electronic devices.

In other words, generally, the system may provide for standardized and/or modular cables for connecting the basic control unit to the electrical/electronic devices, said cables configured at least to carry management signals.

Furthermore, the basic control unit may be configured to verify the correctness of the wiring (i.e., the correctness of the arrangement and the connection of the cables).

According to another aspect of the present disclosure, the basic control unit may be further configured to receive a power signal and to deliver said power signal to the electrical/electronic devices for the power supply thereof. In an embodiment, the power supply may be supplied by the auxiliary unit that is operatively connected to the basic control unit.

The present disclosure also relates to a ventilation system comprising a set of fans, a plurality of electric motors, in particular preferably electronically commutated (EC) motors, adapted to drive (control) said fans, and a system for managing said electric motors as above illustrated.

The ventilation system may be managed by the remote control unit/Master unit, which is interfaced to the motors through the basic control unit.

The features and advantages of the system according to the disclosure will become apparent from the following description of an embodiment thereof, given by way of non-limiting example with reference to the accompanying drawings.

DETAILED DESCRIPTION

With reference to those figures, a system for managing a set of electrical/electronic devices according to the present disclosure is globally and schematically indicated with the reference number 1.

It is worth noting that the figures represent schematic views and are not drawn to scale, but instead they are drawn so as to emphasize the important features of the disclosure. Moreover, in the figures, the different elements are depicted in a schematic manner, their shape varying depending on the application desired. It is also noted that in the figures the same reference numbers refer to elements that are identical in shape or function. Finally, particular features described in relation to an embodiment illustrated in a figure are also applicable to other embodiments illustrated in the other figures.

It is also noted that, when sequences of process steps are illustrated, they do not necessarily follow the indicated sequence, and these steps may be inverted unless the opposite is expressly indicated.

In general, the management system 1 according to the present disclosure is applied in the ventilated heat exchangers field and more generally in the HVAC&R field. The present invention will be hereinafter illustrated in connection with the preferred example wherein the system 1 is adapted to manage electric motors for driving fans, herein indicated with the reference V, of a ventilated heat exchanger, although it is not intended to be limited to this specific application and many other applications are also possible. Furthermore, the present invention will be hereinafter illustrated based on a preferred non-limiting example in which the controlled electric motors are electronically commutated (EC) motors.

Clearly, many other applications are possible, wherein the system 1 is adapted to manage electrical/electronic devices in general, as it will be described later. In other words, as it will be clear from the following disclosure, the term "electrical/electronic devices" refers to any kind of device that can be controlled by the system of the present disclosure, such as electric motors (e.g., EC motors in the preferred application), actuators, and many other devices in many fields of technology, so that this term is to be understood in its broadest meaning. For the sake of simplicity, in the following description, the more general term "electrical devices" will be used, without limiting the scope of the disclosure, this term clearly including also electronic devices.

As it will be explained in detail in the following description, the system 1 of the present disclosure allows simply, automatically, and extremely effectively managing a plurality of electrical devices, such as electric motors arranged to control respective fans V of a ventilation plant.

Figure 1:
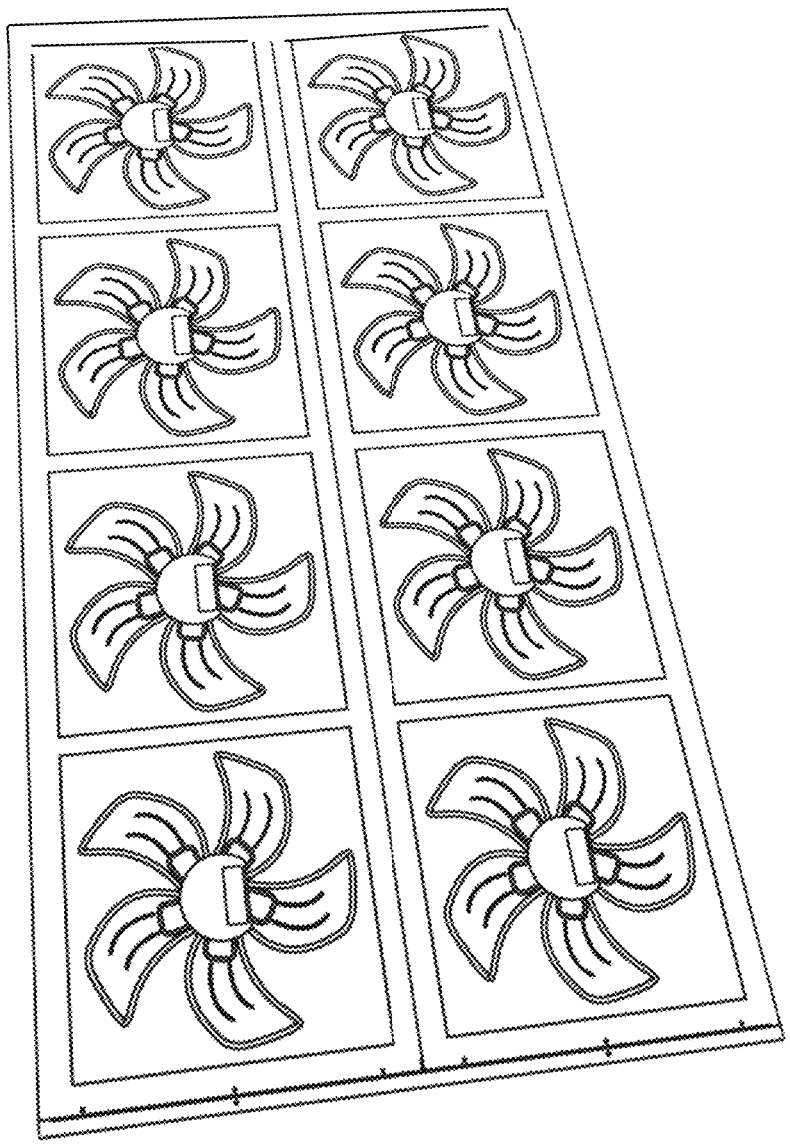
FIG. 1 shows a set of fans of a ventilated heat exchanger.
Figure 2:
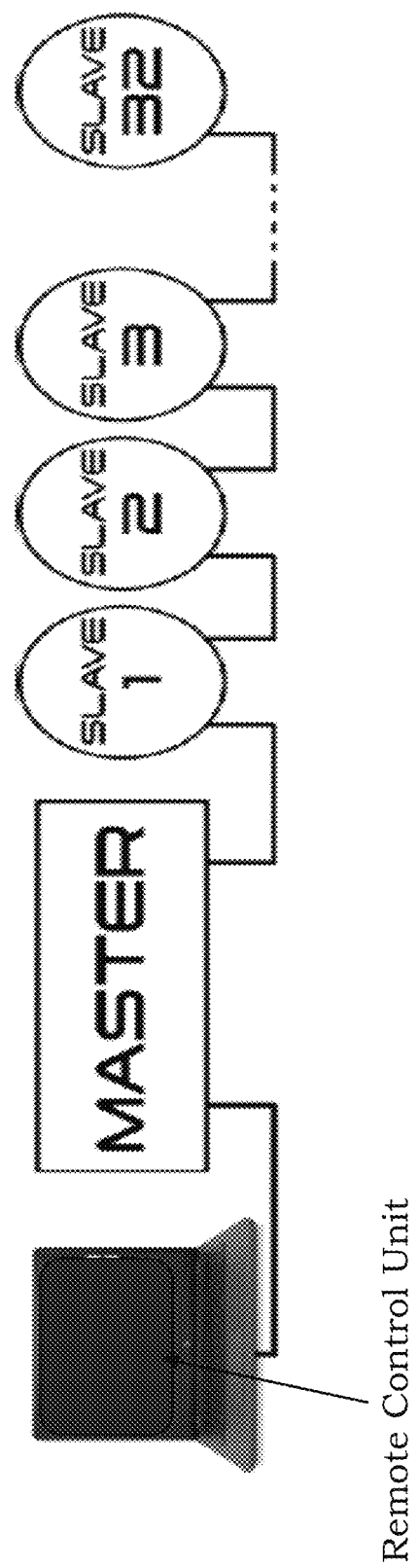
FIG. 2 schematically shows a management system according to the prior art.
Figure 3:
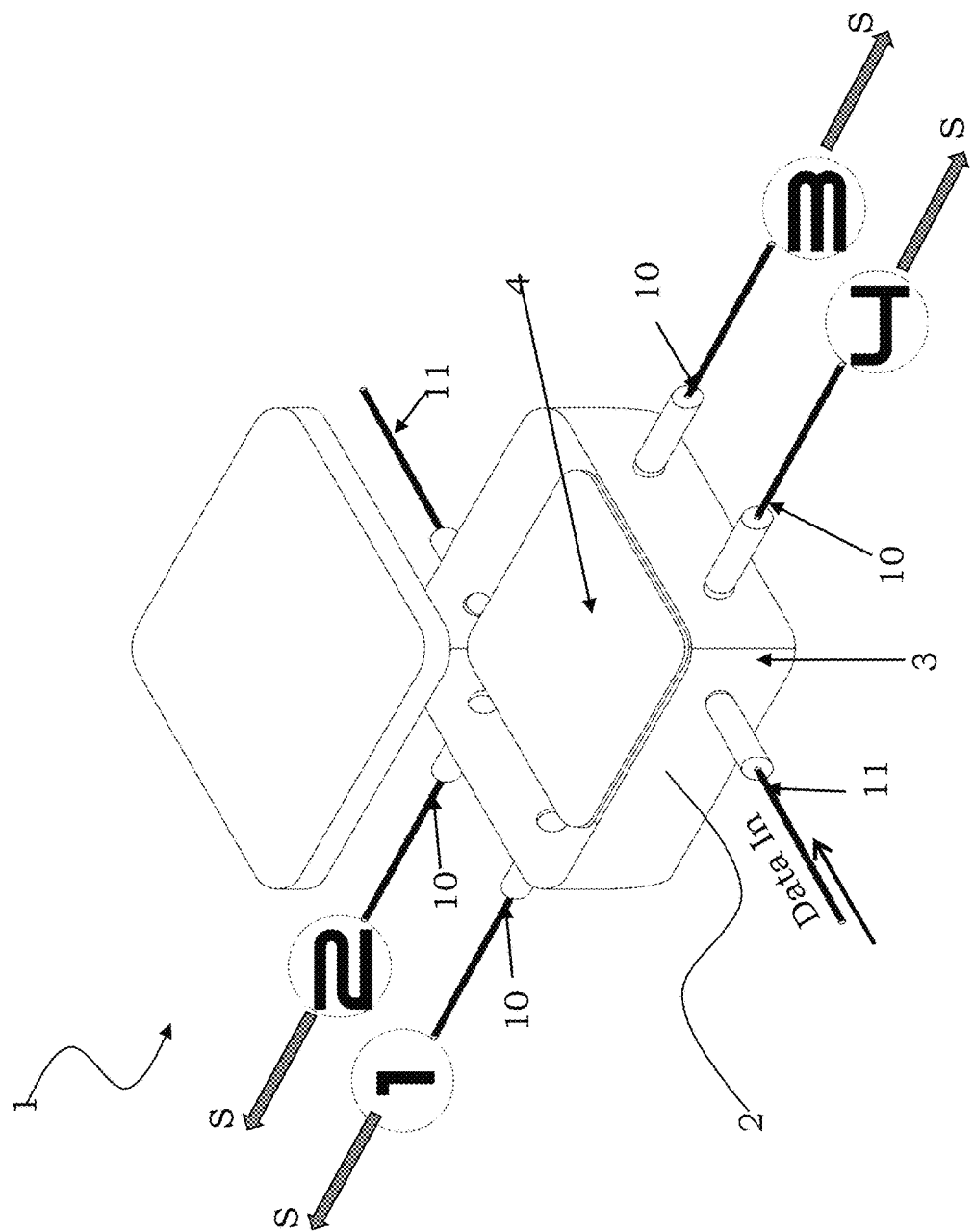
FIG. 3 schematically shows a management system according to the present disclosure, in particular details of a basic control unit are shown.

With reference to FIG. 3, the system 1 first of all comprises a basic control unit or basic module 2, arranged to manage and automatically control a set of electric motors.

The basic control unit 2 comprises a casing 3 which encloses the components thereof. Obviously, the present invention is not limited to a specific kind and/or shape of the casing 3 and any kind and/or shape of casing adapted to the needs and circumstances is possible and falls within the scope of the present disclosure.

In particular, the casing 3 encloses electronic components 4 of the system 1, such as for instance an electronic board including a processor, power electronics and other components known in the field, which will not be detailed herein. The electronic components 4 may also comprise a plurality of dip-switches (for instance twelve dip-switches) for the functional programming of the basic control unit 2, as well as a 0-10V analog input, said input acting as a regulation command and emergency bypass input, for instance to manage the speed (which is generally measured in RPM) of the fans.

In an embodiment, the casing 3 has an IP degree of protection, as defined by the IEC 60529 international standard, which may vary from IP20 to IP55 according to the applications. More particularly, the casing 3 may be airtight with IP55 degree of protection for instance for outdoor mounting, or it may be adequately protected with IP20 degree of protection for instance for insertion into an electrical panel.

The casing 3 comprises passages (for instance through-holes) for housing cables for connecting the electronic components 4 with the electric motors and/or with other units, as it will be detailed later.

Figure 4:
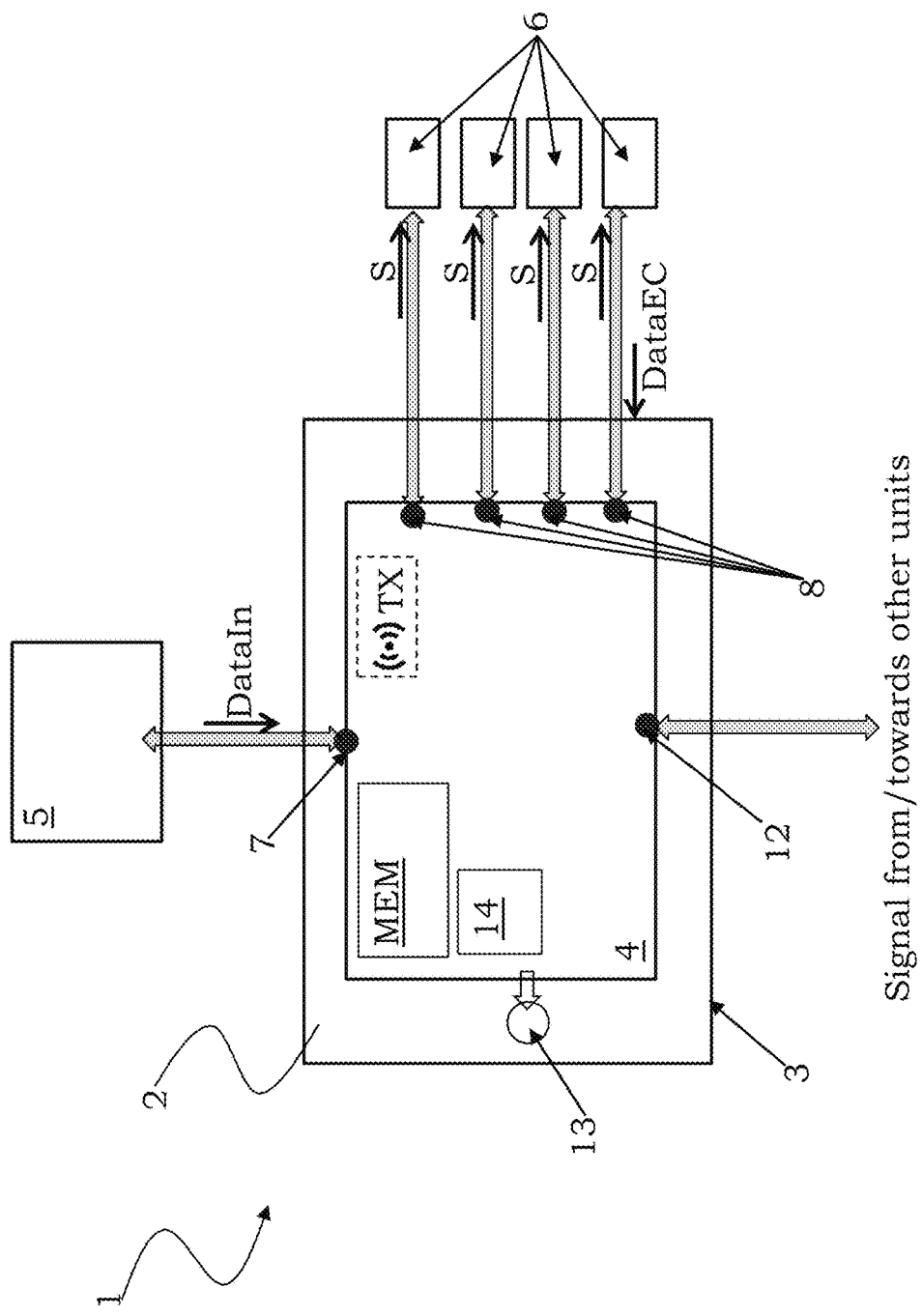
FIG. 4 is a block diagram of the management system according to the present disclosure, in its basic form.

FIG. 4 schematically represents the basic control unit 2 of the system 1 of the present disclosure. Advantageously according to the present disclosure, the basic control unit 2 is adapted to act as interface between a remote control unit (for instance BMS) and/or a Master unit, herein indicated with the reference 5, and a plurality of electrical devices 6 to be controlled. As above indicated, in the non-limiting preferred application example, electric motors are controlled, still indicated with reference number 6.

In particular, through the remote control unit/Master unit 5, the operator may enter the inputs needed for the management of the electric motors 6, the basic control unit 2 allowing an easy and effective interfacing with said electric motors 6, both in the installation/testing phase and in the repair/retrofit phase of a plant/system.

In order to act as interface as above described, the basic control unit 2 comprises at least one data input 7 to receive inputs (indicated in the figures with the reference "DataIn") from the remote control unit/Master unit 5, as well as it comprises a plurality of data outputs 8 connectable with the electric motors 6.

Through the remote control unit/Master unit 5 the user is thus able to send suitable inputs DataIn for the electric motors 6, said inputs DataIn being received and suitably processed by the basic control unit 2, as herein below detailed.

According to the present disclosure, the basic control unit 2 comprises a memory unit MEM including program instructions, e.g., program instructions of an integrated software. The memory unit MEM may be a memory integrated in a main microprocessor of the basic control unit 2, as well as a separate memory unit operationally connected to said processor, wherein the particular hardware architecture adopted does not limit of the scope of the present disclosure. Furthermore, the memory unit MEM is not limited to a specific type, and various types of memories known in the art may be used.

Suitably, the program instructions are executed by the basic control unit 2 (for instance by the control microprocessor thereof) to transform/convert the inputs from the remote control unit/Master unit 5 into management signals S for the plurality of electric motors 6. These instructions are executed automatically by the basic control unit 2 based on the inputs of the remote control unit/Master unit 5. In other words, the basic control unit 2 is able to communicate with the remote control unit/Master unit 5 and with the electric motors 6 (in particular it is able to perform a bidirectional communication) and is suitably programmed to allow an automatic control of the latter thanks to communication protocols stored therein and automatically executed based on the instructions of the integrated software, said integrated communication protocols allowing managing the commands in the most suitable communication mode with the electric motors 6.

The management signals S are output by the basic control unit 2 through the data outputs 8 and are sent to the electric motors 6 via these data outputs 8.

More particularly, by means of the above management signals S, the basic control unit 2 is first of all configured to automatically address all of the electric motors 6 connected thereto, without having to manually address the single motors. The basic control unit 2 is then configured to automatically program the operating parameters of the electric motors 6 and to manage the operation thereof. In this way, the management signals S comprise addressing, programming and management commands, said commands being previously programmed in the basic control unit 2, in particular in the memory unit MEM, for instance based on specific applications and based on suitable communication protocols (for instance as defined by the motors manufacturers).

The basic control unit 2 is further configured to manage each of the data outputs 8 independently from the other data outputs, so as to independently manage the electric motors 6 connected thereto, with considerable advantages in the management and also allowing an easy replacement of individual defective motors.

Suitably, the basic control unit 2 is provided with hardware and software components arranged and configured in such a way that, in a preferred embodiment, the system 1 is plug & play, i.e., such that its advantageous functions are activated when the system is connected, without the need for a complicated installation.

In a preferred but not limiting embodiment of the present disclosure, the basic control unit 2 comprises four data outputs 8 for the automatic and independent management of four respective electric motors 6. In this way, a single unit can manage a large number of motors in a simple way. Obviously, the present invention is not limited to a particular number of controlled motors, and this number may vary according to the needs and/or circumstances.

It is therefore clear that the system 1 of the present disclosure makes the management of a system (such as an advanced heat exchanger programmed for Industry 4.0 and comprising a plurality of electric motors, such as for instance EC motors) unique, efficient and safe. The basic control unit 2 is designed for all of the most common applications on heat exchangers (comprising all of the operating options), and has a reduced number of component codes to cover all the installation, programming and management operations of the motors, in particular single-phase and three-phase EC motors. A great simplification of the programming of the fan group motors is obtained, these motors being addressed, programmed and managed automatically by the basic control unit 2, with great advantages especially in case of service replacement. In this way, the installation phase of an equipment such as a ventilated heat exchanger is greatly simplified. Indeed, the system 1 of the present disclosure is the solution in total safety to all the problems that arise in the delicate wiring and programming phase of the heat exchanger.

In the simplest configuration, the management signals S emitted by the data outputs 8 comprise an analog voltage regulation command of the 0-10 Vdc (direct current) type. The 0-10 V command is the basic command and allows basic regulations such as the adjustment of the rotation speed of the electric motors 6. In this simple configuration, the basic control unit 2 is configured to send the 0-10 V command (as emitted by the remote control unit/Master unit 5) to the electric motors 6.

Advantageously, the management signals S emitted by the data outputs 8 also comprise command instructions for the electric motors 6 based on the Modbus protocol, in order to make the most of all the potential offered by these electric motors. The hardware and software architecture of the basic control unit 2 is therefore suitably configured to allow the execution of the Modbus communication protocol between the remote control unit/Master unit 5 and the electric motors 6.

Still more particularly, in an advantageous embodiment of the present disclosure, the command instructions towards/from the electric motors 6 are based on operating Modbus protocols, wherein the term "operating Modbus protocol" means the Modbus protocol defined by the manufacturer of the motor and expected in order to properly operate the motor (e.g., a proprietary protocol). For instance, the command instructions may be based on the ebm-papst protocol and/or on the ziehl-abegg protocol (according to the type of motor to be controlled, and not limited to these), allowing the control and management of all of the most modern engines, in particular of all of the most modern EC motors and being able to exploit all the functions thereof.

Thanks to the integrated protocols (for instance contained in the above program instructions which are stored in the memory unit MEM), the system 1 of the present disclosure is able to manage the operating Modbus (such as based on the ebm-5 papst protocol and/or on the ziehl-abegg protocol, but not limited to these), and is able to communicate with the remote control unit/Master unit 5 via standard Modbus and to adapt it into said operating Modbus, with selection of the proper protocol, for the suitable control of the electric motors 6.

The above protocols are integrated in the system, for instance they are contained in the memory unit MEM of the basic control unit 2.

A combination of the above solutions is obviously also possible.

In general, the system 1 of the present disclosure is thus a unique system, able to execute hardware commands (for instance the 0-10 Vdc regulation command) and software commands (such as the execution of the Modbus protocol) thanks to the appropriate configuration of the basic control unit 2, and to adapt any hardware/software input program into the operating Modbus with the proper operating protocol, all this being performed automatically without the intervention of the operator.

Preferably, the Modbus protocol is performed through serial connection using the RS485 standard, although other solutions are possible. In particular, in an embodiment, the communication of the remote control unit/Master unit 5 takes place via an RS485 serial line, preferably isolated, with RTU Modbus protocol.

In the system 1 of the present disclosure, the remote control unit/Master unit 5 therefore directly accesses all the operating and regulation options that are available on the EC motors; for example, it is possible to carry out both the management with commands based on the RTU Modbus protocol via the RS485 standard (with transformation from the standard RTU Modbus to the operating Modbus having a proprietary protocol, as seen above), and the basic management with the 0-10 V command and, as it will be described in detail later, also with reading of the functional data of the electric motors 6, permitting the best regulation solution for the needs of the system to be adjusted, thanks to the interfacing with the basic control unit 2.

In an advantageous embodiment, the basic control unit 2 thus acts as gateway with RS485 Modbus communication, interfacing the remote control unit/Master unit 5 with a plurality (for example, but not limited to, four) of EC motors that may be based for example on ebm-papst o ziehl-abegg, said motors driving a respective plurality of fans V. The basic control unit 2 thus comprises RS485 channels dedicated to the data communication.

As above indicated, in an embodiment, the electric motors 6 may have a RS485 interface with RTU Modbus protocol, so that the control through the basic control unit 2 by the unit 5 (which can be for instance a BMS remote system or a system on board the machine) occurs through isolated RS485 serial line with RTU Modbus protocol, and the standard RTU Modbus may be converted into operating Modbus of the motors, i.e. starting from the standard Modbus, it is possible to communicate with the motors via the specific operating Modbus protocols which are integrated into the basic control unit 2.

The basic control unit 2 thus behaves as Master towards the fans V (and thus towards the electric motors 6) and as A Slave towards the remote control unit/Master unit 5.

In this way, the system 1, through the basic control unit 2, allows managing the protocol of the Modbus registers (ebm-papst and/or ziehl-abegg) for each electric motor 6 connected thereto, as well as preparing the information package in response to the queries of the remote control unit/Master unit 5, as it will be detailed hereinafter. In an embodiment, each single basic control unit 2 defines the protocol to be used for the motors connected thereto (for instance ebm-papst or ziehl-abegg).

In other words, in an embodiment, the system 1 of the present disclosure acts as gateway for the electrical devices 6 (such as, for instance, EC motors) with RS485 Modbus interface. In general, the electrical devices have an interface RS485 with RTU Modbus protocol, so that the control operation by the remote control unit/Master unit 5 (remote BMS system or Master on board the machine) takes place through isolated RS485 serial line, with RTU Modbus protocol.

As mentioned, the system of the present disclosure behaves as Master towards the devices to be controlled and as Slave towards the Master/BMS, being in this way the synthesis between a hub and a gateway.

In general, according to the present disclosure, it is possible to transform/convert each input command (both hardware and software) into an advanced communication system, i.e., into a command based on the proper operating Modbus protocol, for a better management of the electrical devices.

For example, in an advantageous embodiment of the present disclosure, the basic control unit 2 is configured to convert an analog voltage regulation command of the 0-10 Vdc type emitted by the remote control unit/Master unit 5 into a Modbus command, in particular into an operating Modbus command (and therefore suitable for controlling motors based on specific operating proprietary protocols such as, but not limited to, ebm-papst and ziehl-abegg). In other words, it is possible to convert into the ebm-papst and ziehl-abegg Modbus protocol also the simple 0-10 Vdc command.

As mention above, more generally, each input command (both hardware and software) may be transformed into an advanced communication system, that is, into the correct operating Modbus command as for instance defined by the manufacturer of the device to be controlled. The system of the present disclosure therefore acts as a simultaneous communication translator that allows efficiently interacting with the motors. The intervention of expert operators who use specialized equipment is therefore no longer necessary.

In this way, the 0-10 Vdc command is remodelled into the Modbus mode (ebm-papst and/or ziehl-abegg), so as to better exploit all of the functions of the electric motors 6 simply thanks to the interface with the basic control unit 2. In this embodiment, the simple 0-10 Vdc regulation of the remote control unit/Master unit 5 is thus transformed into a Modbus command (with the proper protocol for the motor to be controlled), thus activating all the specific functions of this regulation.

The basic control unit 2 is also able to manage the 0-10 Vdc regulation of electric motors without Modbus, activating all the control, surveillance and safety functions in the management of these motors.

The system 1 of the present disclosure therefore adapts to many devices and regulation modes, both with Modbus control and with 0-10 Vdc regulation, offering the choice of the most suitable regulation solution to the needs of the system.

As above mentioned, advantageously according to the present disclosure, the basic control unit 2 is further configured to read, through the data outputs 8, operating data (referred to herein as "DataEC") from one or more of the electric motors 6, and is configured to use such operating data DataEC to generate an information package in relation to the operating status of these electric motors 6. The basic control unit 2 thus makes the above information available to the remote control unit/Master unit 5, in a customizable format.

The basic control unit 2 is thus configured to generate a report for the user, said report essentially representing the identity card with which the correct programming of the electric motors 6 of the fans V is certified. Suitably, the basic control unit 2 is also able to verify, still based on the parameters and the operating data detected through the data outputs 8, the quality of the electrical connections, as well as the correct correspondence of the codes (e.g., of the used components), generating, ordering and preparing the information package in response to the queries from the remote control unit/Master unit 5 and including all this information in the aforementioned report.

The communication between the basic control unit 2 and the electric motors 6 (as well as the communication between the basic control unit 2 and the remote control unit/Master unit 5) is thus a two-way communication that takes place through the data outputs 8 (and through the data inputs as well), wherein in addition to sending program instructions and other commands towards the electric motors 6, it is possible to receive operating data from said electric motors 6, by reading and acquiring the relevant technical-functional data by the basic control unit 2.

The system 1 of the present disclosure is therefore able to simplify the management of a fan unit because it is designed to read/write and make available (for instance following a request from the remote control unit/Master unit 5), in a customizable data package, all the information relating to the electric motors 6 that drive said fans V, also avoiding the possible limitations imposed on the Modbus traffic, such as for instance the maximum number of consecutive registers that can be read and/or written.

It is therefore possible to perform a virtualization of the addresses of the fans, as well as of the protocols (the unit 5 is not required to know if the motors are for instance ebm-papst or ziehl-abegg).

In an embodiment, the system 1 also comprises signalling elements 13 on the basic control unit 2, such as for instance status and signalling LEDs for power supplies (auxiliary voltages), for the Modbus control output channels, for technical failure of the motors and of the control connections and/or of the auxiliaries, as well as failure of the basic control unit 2.

Furthermore, the basic control unit 2 is configured to manage a warning system that includes at least one of a signalling led (which may be for instance included in the aforementioned signalling elements 13), an alarm relay 14 (for instance an alarm relay with switching contacts connected or integrated in the electronic board 4), as well as an alarm codes signalling via Modbus protocol, for instance directly to the unit 5.

In the most general form of the system 1, the connections for each connected electric motor 6 therefore comprise the Modbus signals for programming and managing the motors (D+, D−, REF, as known for the RS485 standard), the analog signal 0-10 Vdc, in particular as a reference for the rotational speed of the motors, as well as alarm relay for reading the status (OK-KO) of these motors.

Each connected electric motor 6 is managed by the basic control unit 2, which is configured to also constantly monitor any problems in the connection cables with said motors, as well as to check the quality of the connection with the individual motors, generating an error and/or alarm signal if an anomaly is found.

It is therefore possible to check the status of the electric motors 6, in particular the status of EC motors, to read and acquire their technical-functional data, to manage the transient alarm and warning codes, as well as to perform many other advantageous functions, the system 1 of the present disclosure being in fact a very versatile and easy to use system, allowing total control.

Figure 5:
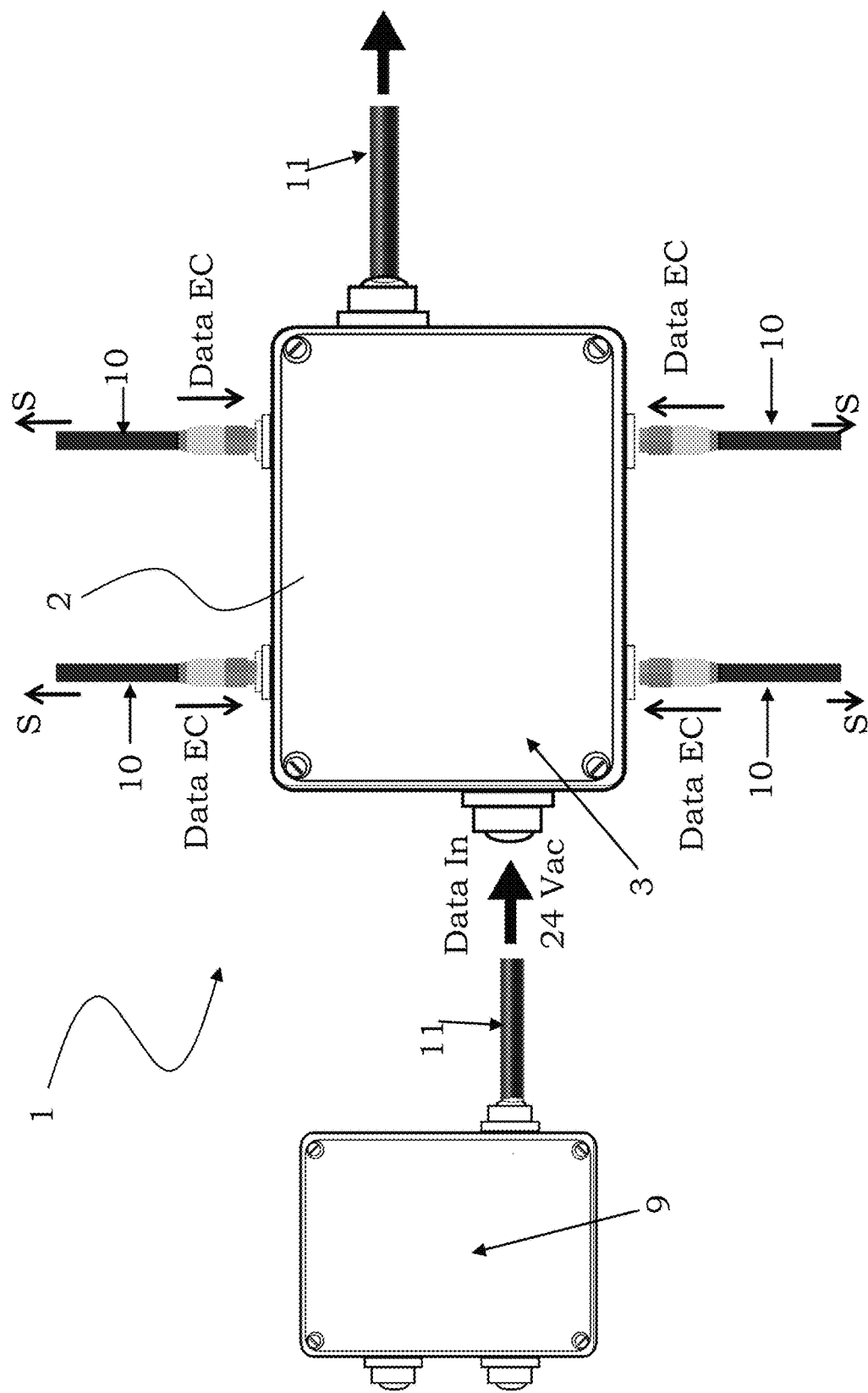
FIG. 5 shows the basic control unit of the present disclosure and an auxiliary unit connectable thereto.

Referring now to the FIG. 5, in an embodiment of the present disclosure, the system 1 also comprises an auxiliary unit 9 operatively connected to the basic control unit 2 and configured at least to provide a power supply to said basic control unit 2. In an embodiment, the power supply provided is 24 Vac (alternating current).

The auxiliary unit 9 is preferably connected to the basic control unit 2 by means of the data input 7, which, in addition to the data passage, also allows the power supply of the system 1. The auxiliary unit 9 is thus arranged between the basic control unit 2 and the remote control unit/Master unit 5, receives as input from said remote control unit/Master unit 5 the input data DataIn (such as for instance the standard Modbus signal and the 0-10V command), and transfers said commands, along with the power supply, to the basic control unit 2.

Figure 6:
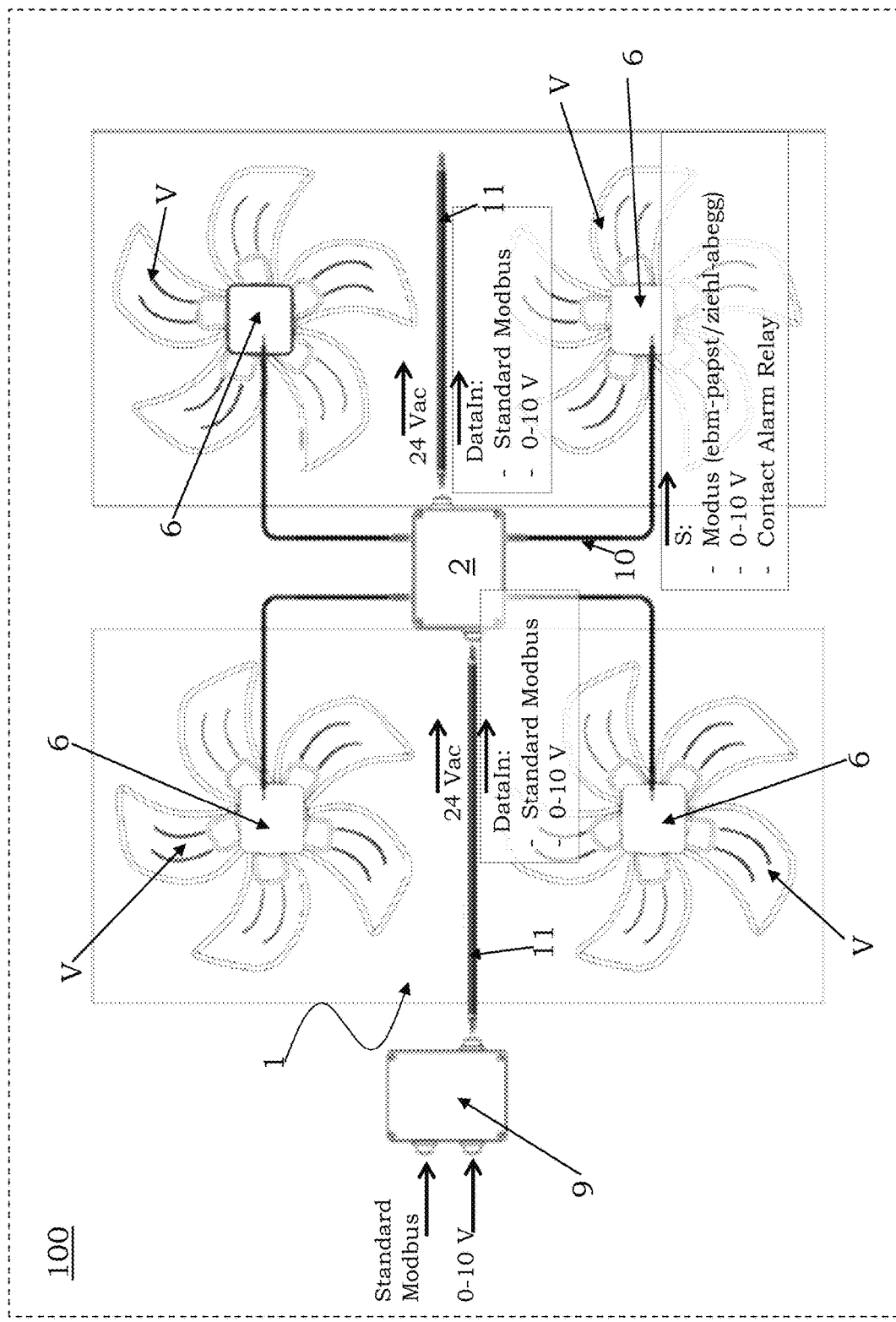
FIG. 6 shows the basic control unit of the present disclosure connected to four electric motors for actuating respective fans, along with the transmitted data.

FIG. 6 shows the system 1 comprising the auxiliary unit 9, wherein the basic control unit 2 is programmed for the management of four electric motors 6. In this figure, the main signals transmitted are also shown, according to the previous description. In particular, according to the various configurations, the standard Modbus signals and/or the 0-10 Vdc command are sent by the remote control unit/Master unit 5. The auxiliary unit 9 (which may not be present) transmits these signals, along with the power supply, to the basic control unit 2. As above indicated, the basic control unit 2 is configured (both from a hardware and software point of view) to send to the electric motors 6 the signals S suitable for their management, such as the signals based on the operating Modbus selected for instance from ebm-papst and/or ziehl-abegg, as well as the 0-10 Vdc command. Through the data outputs 8, and suitable cables, the contacts for the alarm relays, for instance for the management of anomalies, are also transmitted. The standard Modbus signals and the 0-10 V command from the remote control unit/Master unit 5, as well as the power supply, may possibly be transmitted by the basic control unit 2 also to other basic control units connected thereto for the control of other motor units, as described in the following paragraph.

Figure 7:
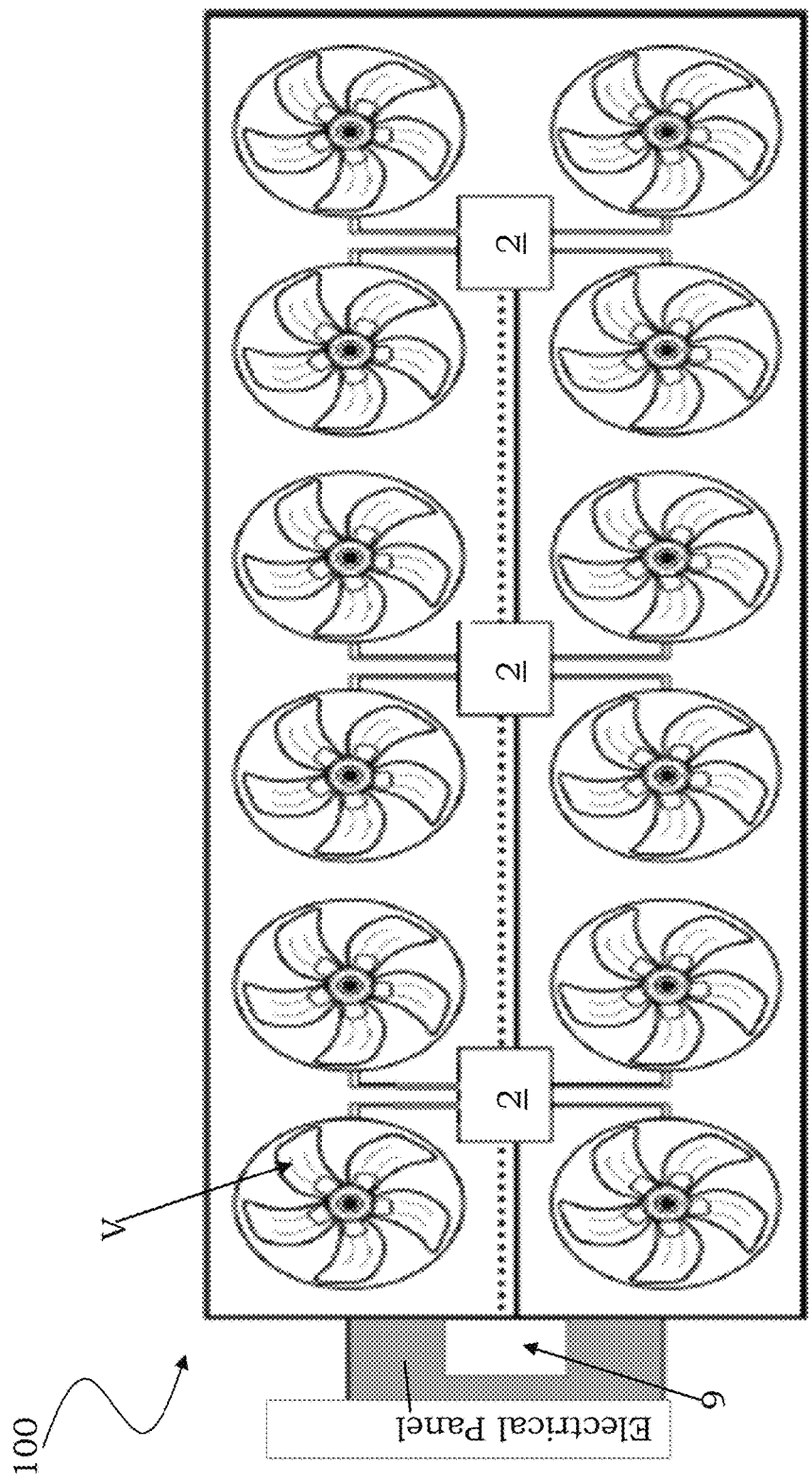
FIG. 7 shows a plurality of basic control units acting as modules connected to each other for actuating respective pluralities of electric motors.
Figure 8:
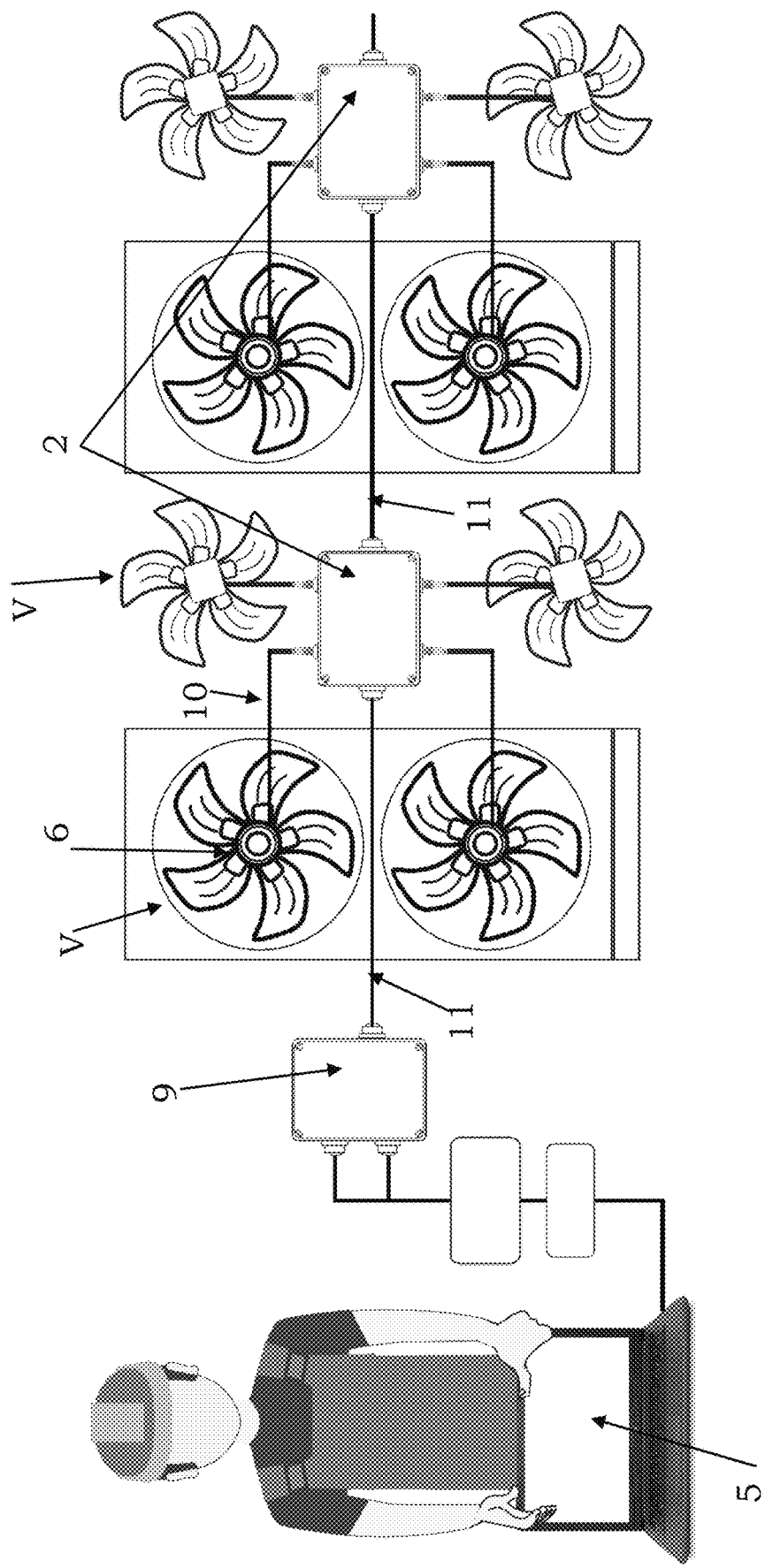
FIG. 8 shows the system of the present disclosure interfaced to a remote control unit/Master unit and to a plurality of electric motors for actuating respective fans, wherein there are, by way of example, two basic control units for driving four respective motors.

Advantageously according to the present disclosure, with reference to FIGS. 7 and 8, the basic control unit 2 is a modular element interfaceable to other basic control units, each basic control unit 2 being adapted to control a respective plurality of electric motors 6. In this way, the system 1 of the present disclosure comprises a plurality of basic control units 2 which form a set of modules connected to each other in series, each of said basic control units 2 comprising a specific output 12 and an input for the connection with the other modules.

Preferably, in an embodiment, the data input from the previous module corresponds to the data input 7 above described, whereas the output 12 towards the following module is an independent output. Obviously, said inputs and outputs may be inverted depending on whether data are transmitted for the control of the motors or whether operating information on the status of these motors is transmitted.

The modular configuration described above is very advantageous when there is the need to manage a large number of electric motors 6, since this task is solved by a set of modular basic control units 2 (all the same) connected to each other in series, each being arranged for the management of the respective (preferably, but not limitedly, four) electric motors 6.

Suitably, the connections with all the electric motors 6 are standardized. Each basic control unit 2 is provided with its own cables 10 for the connection with the electric motors 6 (said cables being identical, modular and standardized for each unit and for each motor and configured at least to carry the management signals S), as well as with cables 11 (also being identical, modular and standardized for each unit and configured at least to carry the inputs) for the connection in sequence with the other modular basic control units and/or with the auxiliary unit 9 and with the remote control unit/Master unit 5. The cables 10 and 11 are suitable for carrying signals as above described (see for instance the discussion in connection with FIG. 6). The term "standardized cables" thus indicates cables that are structurally and/or functionally the same, with identical connections adapted to interface with the basic control unit 2, the motors and other units, configured to carry a certain type/s of signal/s, greatly simplifying the installation of the system. In other words, the skilled person recognizes that "standardized" cables means that these cables (or wiring) are identical (i.e., of the same type) for each controlled device, in particular equal for each specific respective function and/or application programmed in the memory unit MEM and to be executed towards the devices; therefore, in case of many devices, modules of the same cables are always used, thus greatly simplifying the work of the operator. For instance, the connections to the basic control unit 2 may always be the same, as well as the connections to a type of electrical devices (e.g., to EC motors) are arranged to be always the same, i.e., standardized, the system in fact providing for carrying a predetermined type of management signals for the specific devices to be controlled.

The main advantages of the system 1 according to the present disclosure are therefore also linked to the modularity of the components, which increase with the number of electric motors 6 and fans V of the ventilating machine to be controlled, keeping the repetitive structure of the basic components unaltered, in particular of the basic control unit 2 for the integral management of a plurality of EC motors, for instance with ebm-papst and ziehl-abegg integrated Modbus protocols. More particularly, said modular components include the above basic control unit 2, the cables 10 for the connection with the electric motors 6 (for instance four identical cables 10 for each basic control unit 2) and the cables 11 for the connection with the adjacent modules, all these components being suitably standardized.

All operations on the fan system are also carried out without modifying the electrical panel.

In order to perform all the aforementioned functions, the electronic components 4 may comprise connection terminal blocks (or clip) for the connections with the motors and with the other remote control units, as well as a microcontroller with insulated interface for RS485 serial line with RTU Modbus protocol, command and reading interfaces of the status of the motors.

Furthermore, in an embodiment of the present disclosure, there are means that allow the basic control unit 2 to interface with another remote unit (not shown), which can be physically very distant. For instance, referring again to FIG. 4, reception/transmission means TX may be present, which may be wireless or wired, as well as such communication may take place via the remote control unit/Master unit 5.

From the previous description, it is clear that the scope of protection of the present disclosure also relates to a ventilation system 100 comprising a set of fans V, a plurality of electric motors 6 adapted to drive said fans 6 and a system 1 for managing said electric motors 6 according to the present disclosure as above described.

In particular, briefly summarizing the above, the system 1 is able to adjust the speed (RPM) of the fans V, to modify the working parameters of the motors, and read and/or write the Modbus registers of each single motor, as well as to convert the 0-10 Vdc command in the Modbus mode (for instance ebm-papst and ziehl-abegg).

In an embodiment, the system of the present disclosure provides the BMS systems directly with the input and holding registers of the latest generation Modbus protocols (for instance ebm-papst and ziehl-abegg).

In an embodiment, there are numerous Modbus registers to activate the regulation and management functions of the devices 6. For example, nine contiguous registers are reserved for each device, containing an image of the content of the registers of the corresponding device. Each register is made up of a single 16 bit word.

The system allows the pre-wiring of the single electric motor, in particular EC motor, and simplifies the wiring of said motors, verifies the connection of the single EC motor and guarantees the operation in case of technical-functional failure. It avoids interruptions due to connection failures and keeps the fan unit operational, activating the emergency mode in case of failure of a motor or of the Modbus connection. The motors are managed independently from each other and the system is able to make reports and isolate engines with anomalies.

Figure 9A:
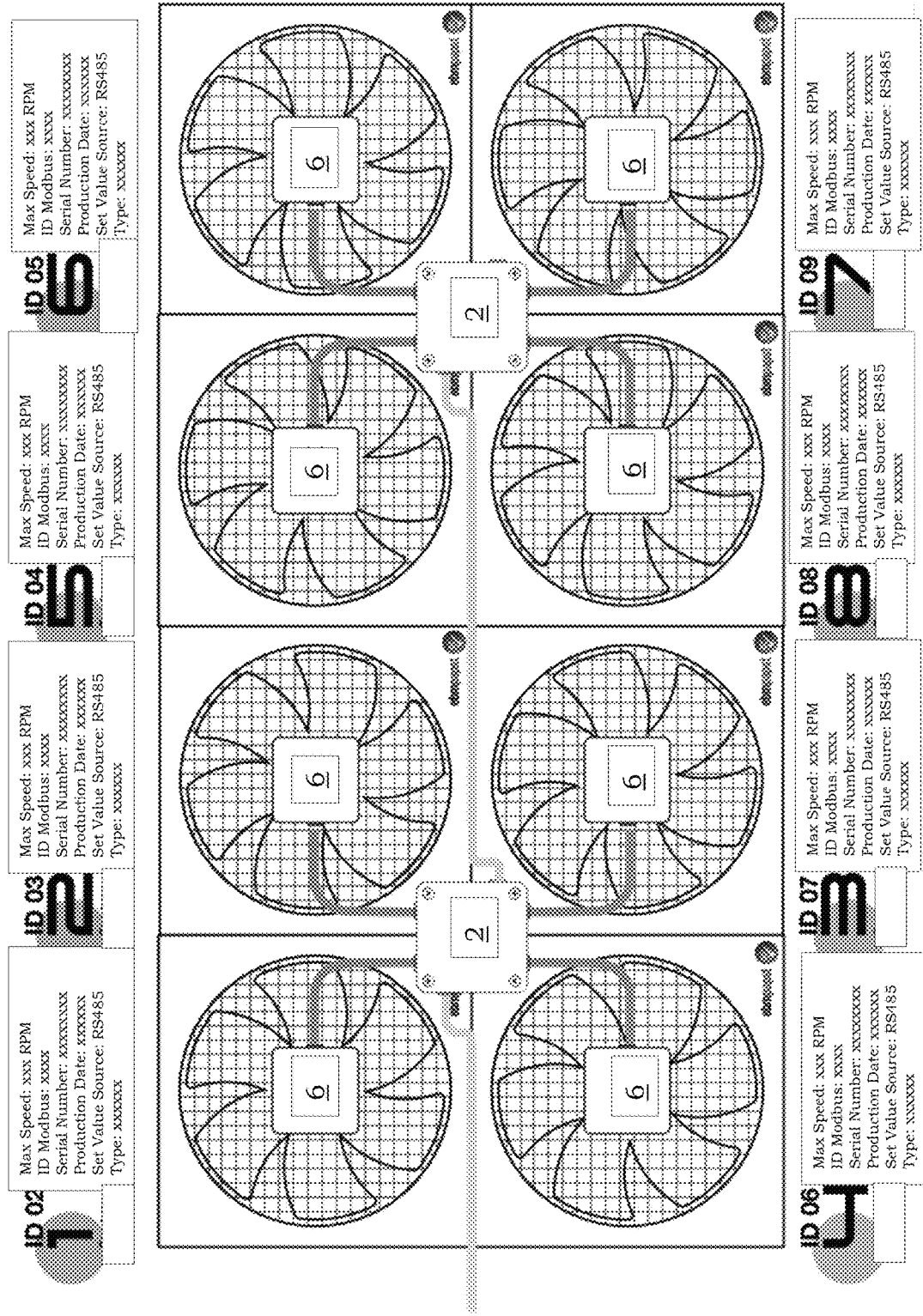
FIGS. 9A-9B show examples of programming and management of the system of the present disclosure.
Figure 9B:
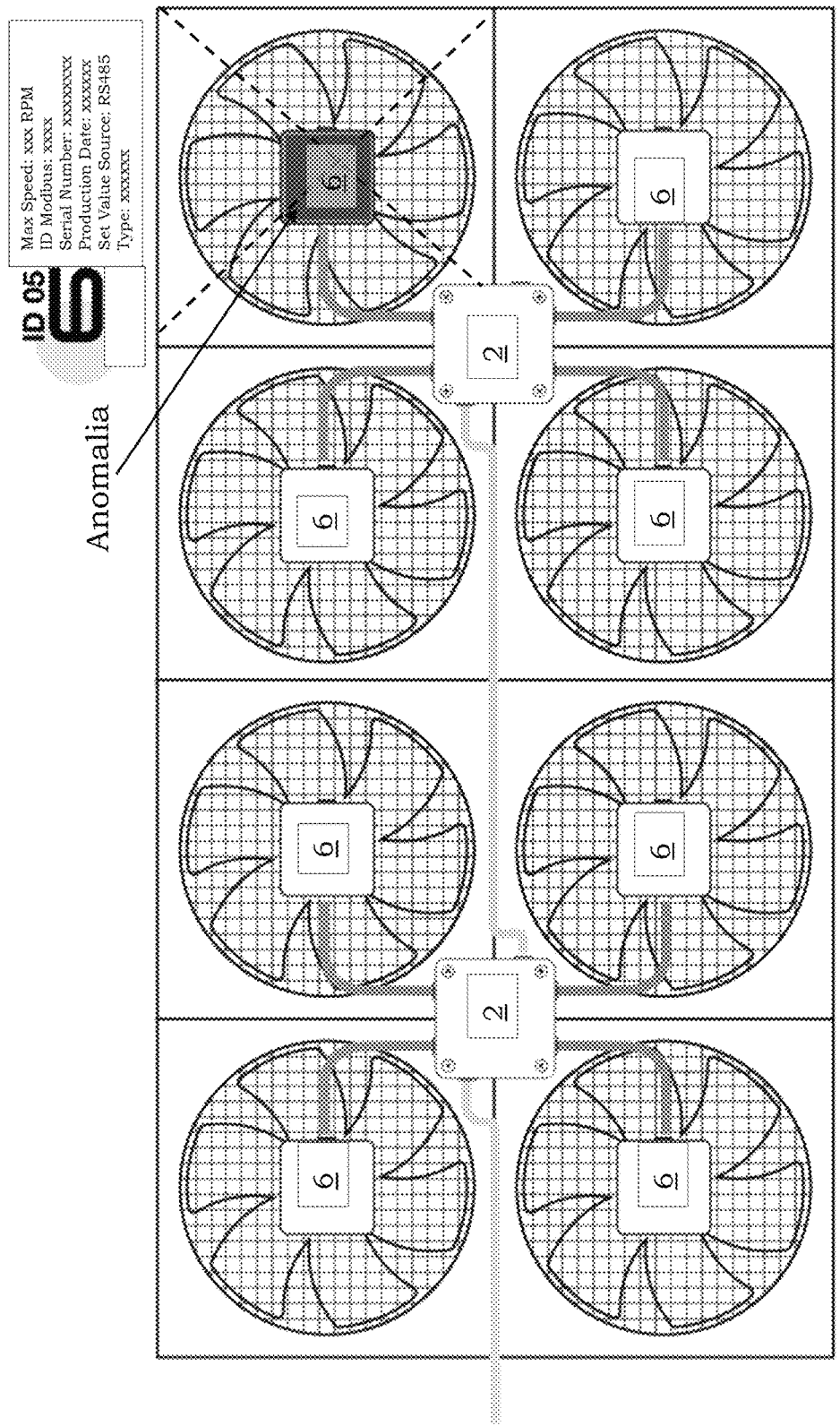

In this regard, reference is made to FIGS. 9A-9B, which depict examples of programming and management of the system of the present disclosure. The system 1 is able to totally manage the ebm-papst e ziehl-abegg EC motors thanks to the integrated Modbus protocols. After having correctly addressed and programmed the present motors (FIG. 9A, wherein the various values are automatically programmed by the system), it checks the wiring and the status of the motors, reporting any anomalies (FIG. 9B, wherein for instance an error is identified and suitably reported). The service work is therefore considerably simplified, as this defective motor is easily replaced (thanks to the modular wiring and to the plug & play connection system) and the new motor is automatically reprogrammed with the same parameters (in particular the system checks the compatibility of the new motor and reprograms it with the working parameters as for instance established by the remote control unit/Master unit 5), without the need for manual reprogramming. Thanks to the integrated program instructions, the basic control unit 2 is in fact able to acquire and report the problems of the defective motors (identifying the problems encountered), and therefore to allow the automatic replacement of the motors by automatically reprogramming the new connected motor. The plug-in system thus solves all the problems related to the replacement, the connection via cables with the basic control unit 2 being sufficient for the execution of all the desired operations.

The system 1 of the present disclosure automatically addresses each connected motor and automatically programs the working parameters of these connected motors. It protects the correct operation of each connected motor and keeps the level of the transmitted Modbus signals constant. In particular, the system 1 of the present disclosure monitors the level of the Modbus signals received from the motor and acquires and signals the malfunctions of the motor, as well as it keeps the operating information of the motors, which may be acquired and then stored in the memory unit MEM, as well as transmitted to the remote control unit/Master unit 5.

The system 1 of the present disclosure activates and manages the special Modbus functions of each motor, such as for instance the emergency speed (i.e., Emergency RPM in case of loss of the command signal), the cleaning function (i.e., the reverse rotation for battery cleaning), the maximum speed limit function (i.e., the maximum RPM of the fan, in order to limit the air noise) and the hand/shake function (i.e., the progressive unlocking of the motor for ice), and the like.

Thanks to the integrated protocols, the system also allows a minimum speed at 4%, a homogeneous speed for all the connected motors, a possible shutdown of the single motor to reduce the power of the exchanger, a shutdown of the single motor in case of emergency, as well as the acquisition and reading of alarm parameter data.

In conclusion, the present disclosure provides a modular basic control unit as interface between the remote control unit/Master unit and the set of electric motors to be controlled, in particular EC motors to be controlled and managed, said modular unit acting as addressing and programming unit for said electric motors. In this way, the described management system makes the management of an advanced heat exchanger equipped with a plurality of electric motors, for instance designed for Industry 4.0, unique, efficient and safe, since the modular basic control unit is able to easily communicate with the control system and with the motors and is suitably configured with integrated management protocols that allow its immediate installation and effective addressing, programming and management of the motors. The improved communication with the motors allowed by the modular basic control unit further allows generating, through said basic control unit, a report which depicts the status of the system. In case of a large number of motors to be controlled, the present disclosure provides for simply connecting multiple modular units in series, all connections being standardized and extremely simple to make. The modular units are plug & play so that their operational features are easily activated without complicated installation procedures. A hardware and software modular system is thus provided, which easily manages the automatic programming of the EC motors of single-phase and three-phase fans, simplifies the Modbus management by the Master thanks to the presence of integrated Modbus protocols, such as for instance the ebm-papst and/or ziehl-abegg protocols integrated into the basic control unit. The system further ensures total operator safety in the testing and service phase and keeps the fan system operating even in the event of anomalies (such as, for instance, an anomaly in the Modbus network), thus solving all the connection and programming problems of systems having EC motors.

The system of the present disclosure therefore solves all the current problems related to the components and to the safety of the installation/testing/maintenance process of a ventilation system, in particular by simplifying and industrializing the electrical connections for the management and monitoring of electric motors, in particular EC motors, intended for the control of the fans of a ventilated heat exchanger. The system of the present disclosure eliminates critical issues and solves all technical-functional problems in total safety, thanks to the basic control unit which is able to execute program instructions of a dedicated integrated software, thanks to the dedicated modular system, and thanks to the modular distribution of the connection of the control auxiliaries, offering an extremely versatile system for all regulation applications for EC motors, for instance ebm-papst and ziehl-abegg, three-phase and single-phase motors. Therefore, a modular system is provided for the total management of the motors.

The system of the present disclosure allows the use of a modular electrical structure, simply using multiples of the same codes (i.e., multiples of the same components), thanks to the modular structure of the basic control unit and of the cables, which are also modular and suitably configured to carry certain types of signals for the motor management. As above illustrated, modular wiring (or modular cables) indicates the use of a same type of cables for the devices to be controlled, so that the components of the system of the present disclosure are adapted to the number of devices without increasing the codes used, for instance with only four codes (basic unit, auxiliary unit, cables between basic units and cables for electrical devices), ensuring total modularity.

This allows for an extreme ease of management, allowing the use of a single basic control unit (or multiples thereof) accompanied by the appropriate cables, which unit autonomously carries out the addressing, programming and management operations, without the need for single installations of the motors.

The modular connection of the elements favors both the pre-wired bench assembly and the quality check of the individual electrical connections of the cable(s) and of the Modbus signal levels, highlighting possible wiring problems.

From the above it is evident that the system of the present disclosure simplifies the wiring of the plant, since the fans may be pre-wired before assembly or directly wired on the plant via plug-in.

During the testing phase, thanks to the ability of the basic control unit to efficiently interact with the motors, the system of the present disclosure certifies the quality of the connections, automatically identifies and programs the connected motors, also collecting the data for the final report, which highlights and depicts the technical details and compares the programmed work parameters of all the fans, highlighting differences and anomalies.

The system of the present disclosure therefore simplifies the commissioning of a new plant such as a fan heat exchanger, and in case of failure of one or more motors, allows an easy replacement and insertion of the new motors in the system that will be connected to the basic control unit, addressing and programming them automatically when started. More particularly, thanks to the possibility of a bidirectional communication with the motors and with the remote control unit/Master unit (for instance following queries by the Master), the system according to the present disclosure highlights where to intervene and what to replace, making the technical intervention more efficient with the automatic re-insertion of the replaced components, wherein the basic control unit is able to automatically program the motors based on the program instructions stored therein, for instance program instructions that are specific to certain systems to be controlled.

The system according to the present disclosure therefore allows immediately identifying the cause of the problems, and signals the functional status via hardware and software, for instance with the signalling LEDs on the device, with the alarm relay and with the alarm codes signalling via Modbus protocol.

A feature of the system of the present disclosure is its great versatility, this system being configurable for all applications on ventilated heat exchangers, dry coolers, remote condensers and gas coolers, up to the ventilating walls (EC fan-grid), the system providing for the complete management of the connected EC motors.

The basic control unit may be suitably programmed based on the type of motors to be controlled; in general, it comprises all the instructions for managing the system and it can be installed in an extremely simple way and in total safety for the operators, who no longer have to program the motor directly with the wiring box open. Furthermore, it is not necessary to resort to specialized operators, but operators with basic electrical knowledge will be sufficient.

Figure 10A:
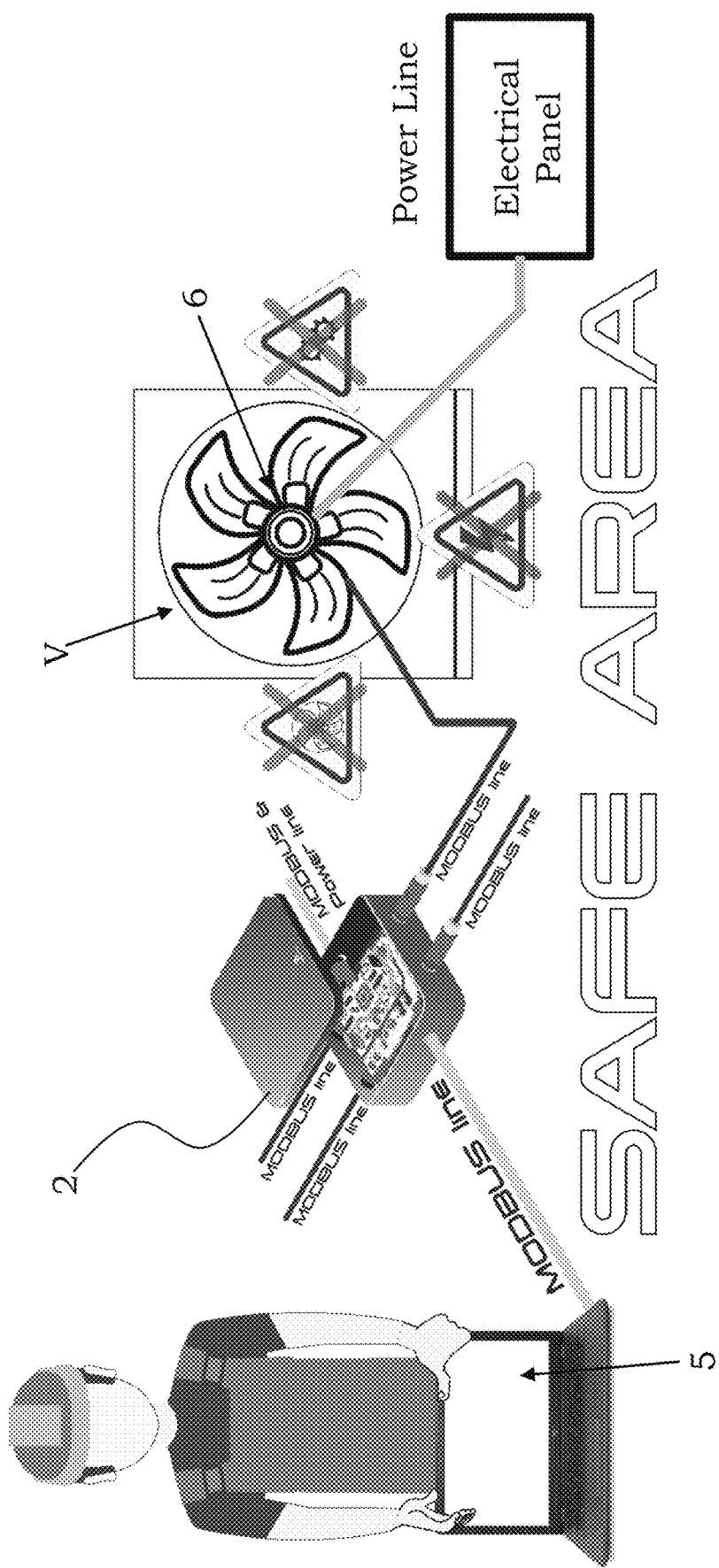
FIG. 10A shows a schematic example of connections of the system of the present disclosure.

From FIG. 10A it can be seen that, thanks to the system of the present disclosure, an operator is able to work in total safety since the programming of the motors does not involve direct interaction with them. FIG. 10A also shows that the power connection of the motors preferably occurs prior to programming and, preferably, the power cables are kept separated. The operator is able to visually check the result of the work carried out by the system according to the present disclosure, which acquires data and reports the problems encountered in the programming phase of the connected motors.

Figure 10B:
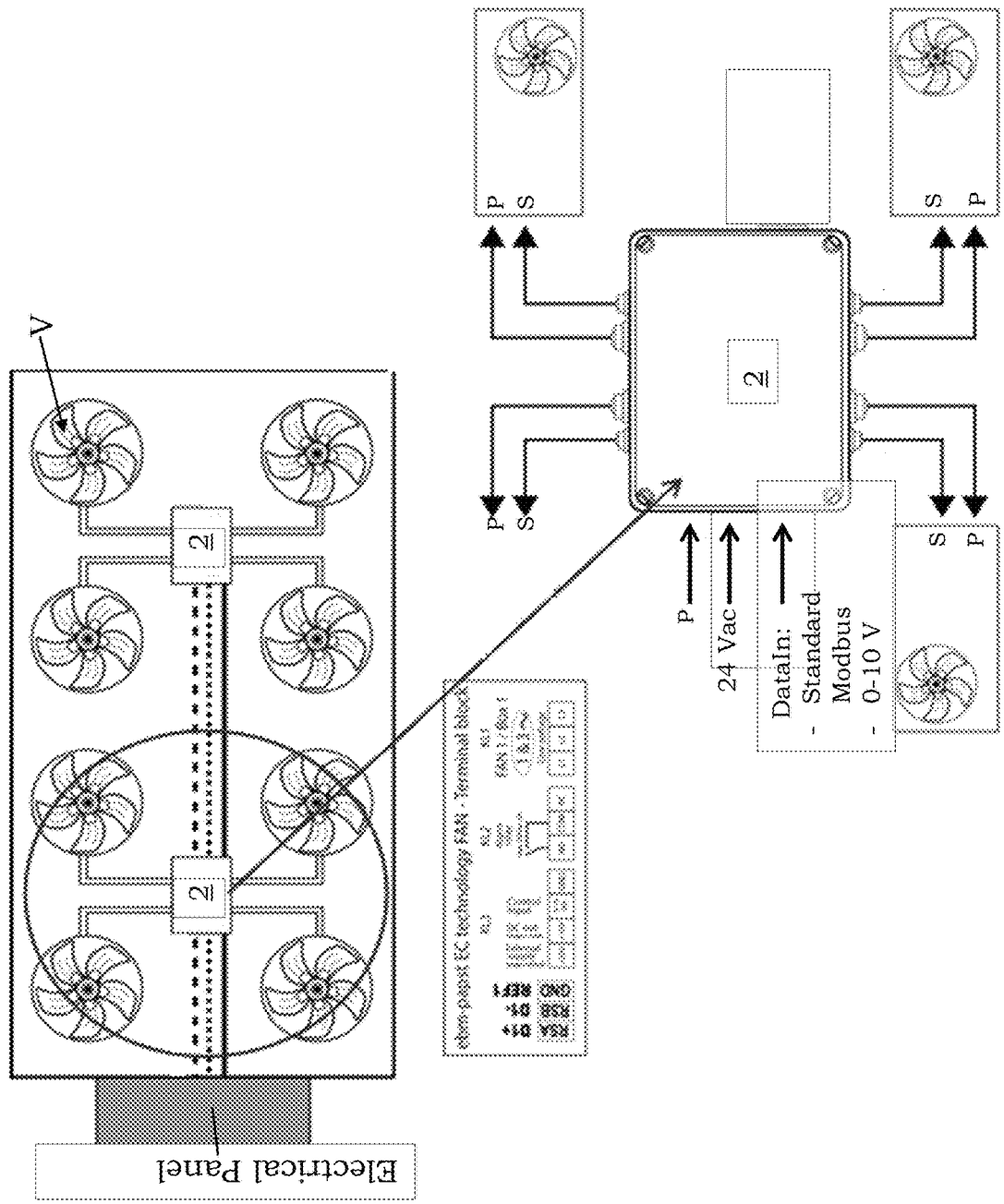
FIG. 10B shows a schematic example of connections of the system according to another embodiment of the present disclosure.

In an alternative embodiment of the present disclosure, the basic control unit 2 may further be configured to receive a power signal P (for instance from the electrical panel) and to deliver said power signal P to the electric motors 6 for the power supply of said electric motors 6. By way of example, the power supply may be provided by the auxiliary unit 9 operatively connected to the basic control unit 2 and to the electrical panel. In this way, the electric structure of the basic control unit 2 is such that it is also able to deliver the power supply (single-phase/three-phase) to the group of electric motors/actuators connected, thus also managing the power part of said motors/actuators. Obviously, the power part is suitably shielded. This embodiment is schematically illustrated in FIG. 10B, wherein the indicated connections and signals are only by way of non-limiting example.

In this embodiment, the electric panel has an extremely simplified structure and the single protections of the power lines with the main switch and the adjustment unit are located therein. The basic control unit 2 comprises, in an exemplary embodiment, a remote control switch/relay for each connected fan, connection terminal blocks for each motor/fan, for instance power ones (L1, L2, L3, PE), Modbus signals (D+, D−, REF), 0-10 V signals, thermal/alarm relay for reading in series, thermal/alarm relay for local reading with Modbus output (as an alternative to reading in series), terminal blocks for connection towards the main panel for power, Modbus signals, parallel of 0-10V signals, alarm relay HW, as well as terminal blocks for connection towards other basic control units, and a microcontroller with insulated interface for RS485 serial line with RTU Modbus protocol, power supply remote control switches command of fans, reading of the fans status. The pre-wired basic control unit therefore allows the three-phase power supply to be carried to the motors with the thermal (TK), in addition to all the functions described above. The power cables of the individual modules are connected to the main panel.

The previous advantages also apply in this case, among which there are the simplification in the management of the motors, which are automatically addressed and programmed even in the event of replacement for maintenance and/or service, the simplification of electrical connections, with standardized wiring (i.e., cables which are already made to measure and always the same), the possibility of using operators with basic electrical knowledge, and the significant reduction to a reduced number of component codes, to cover all powers (up to 250 Ampere) and the management options both in local and in BMS systems. Since all the basic options are provided, dozens of codes related to the variants proposed and/or requested by the customer for the electrical panels thus disappear.

In general, thanks to the teachings of the present disclosure, there is thus provided a device that simplifies and solves all of the critical issues related to the connection, programming and management of electric motors in the Modbus network, this device being provided, in an embodiment, with the ebm-papst and ziehl-abegg protocols already integrated, allowing an optimal control of the most modern EC motors. Therefore it allows a standard Modbus system to directly manage all of the specific functions of the ebm-papst and ziehl-abegg Modbus protocols, so as to be able to manage all the fans, including those with latest generation motors, such as EC motors.

Furthermore, the system of the present disclosure guarantees the continuity of operation of the ventilated exchanger, limiting the functional problem only to the motor in technical failure, without interrupting the regulation chain. More particularly, the modularity of the system and the configuration of the data outputs avoid unwanted interruptions in the event of faults in the connection of the EC motors, signalling and isolating the defective part and keeping the fan unit operational.

Suitably, the present disclosure provides the standardization of the wiring of the three-phase and single-phase EC motors commands, since it provides the modularity of the electrical connections, with cables already made to measure and always the same. The distribution of the connections of the command auxiliaries is then made modular, being identical for all the applications for three-phase and single-phase EC motors.

As previously mentioned, thanks to the system of the present disclosure, it is also possible to carry out the preventive wiring of the motors, before being placed on the heat exchanger.

The described system interacts and makes itself available to the Master, to perform the work functions for the optimal management of the EC motors of the ventilated heat exchanger and to transmit the operating data package in the mode requested by the Master.

Applications

The system of the present disclosure has several advantageous applications, of which only some are listed herein by way of non-limiting example.

Figure 11B:
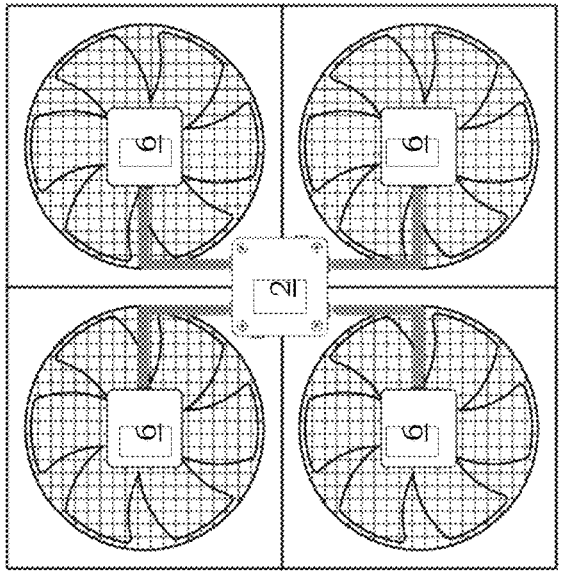
FIGS. 11A-11C show different configurations of connection between the basic control unit and electric motors.
Figure 11A:
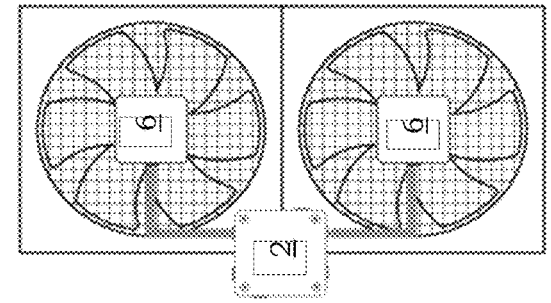
Figure 11C:
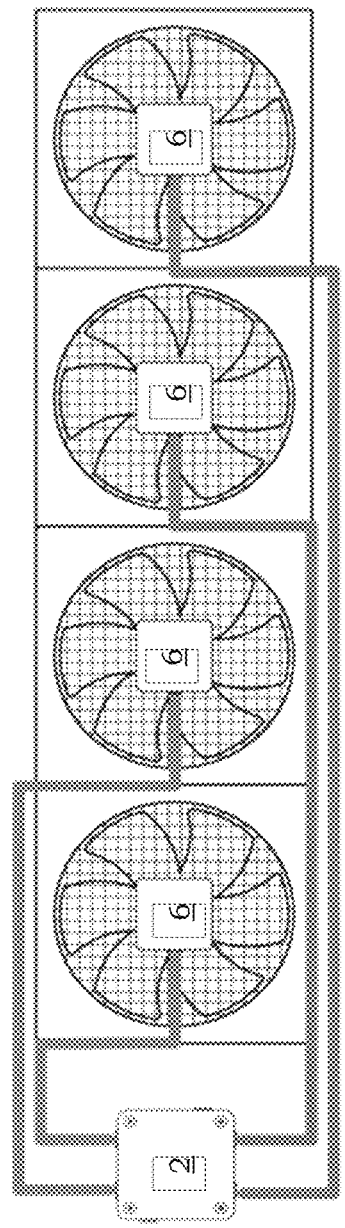
Figure 12B:
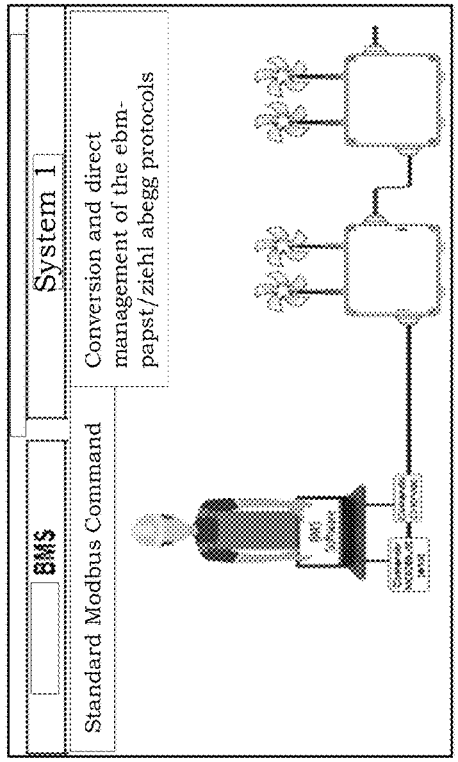
FIGS. 12A-12D schematically show different general cases of management architectures by means of the system of the present disclosure.
Figure 12A:
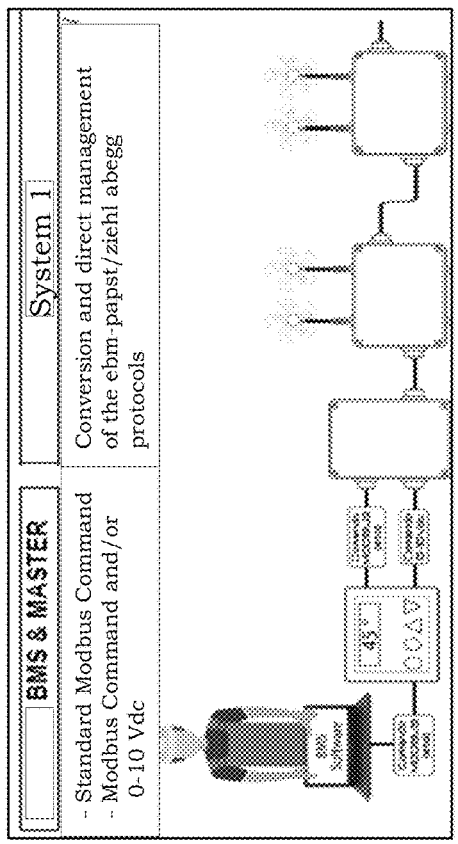
Figure 12C:
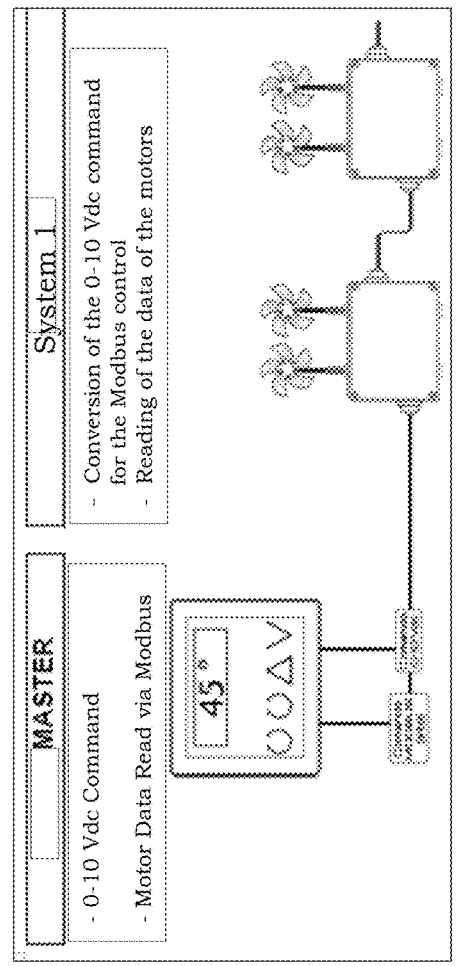
Figure 12D:
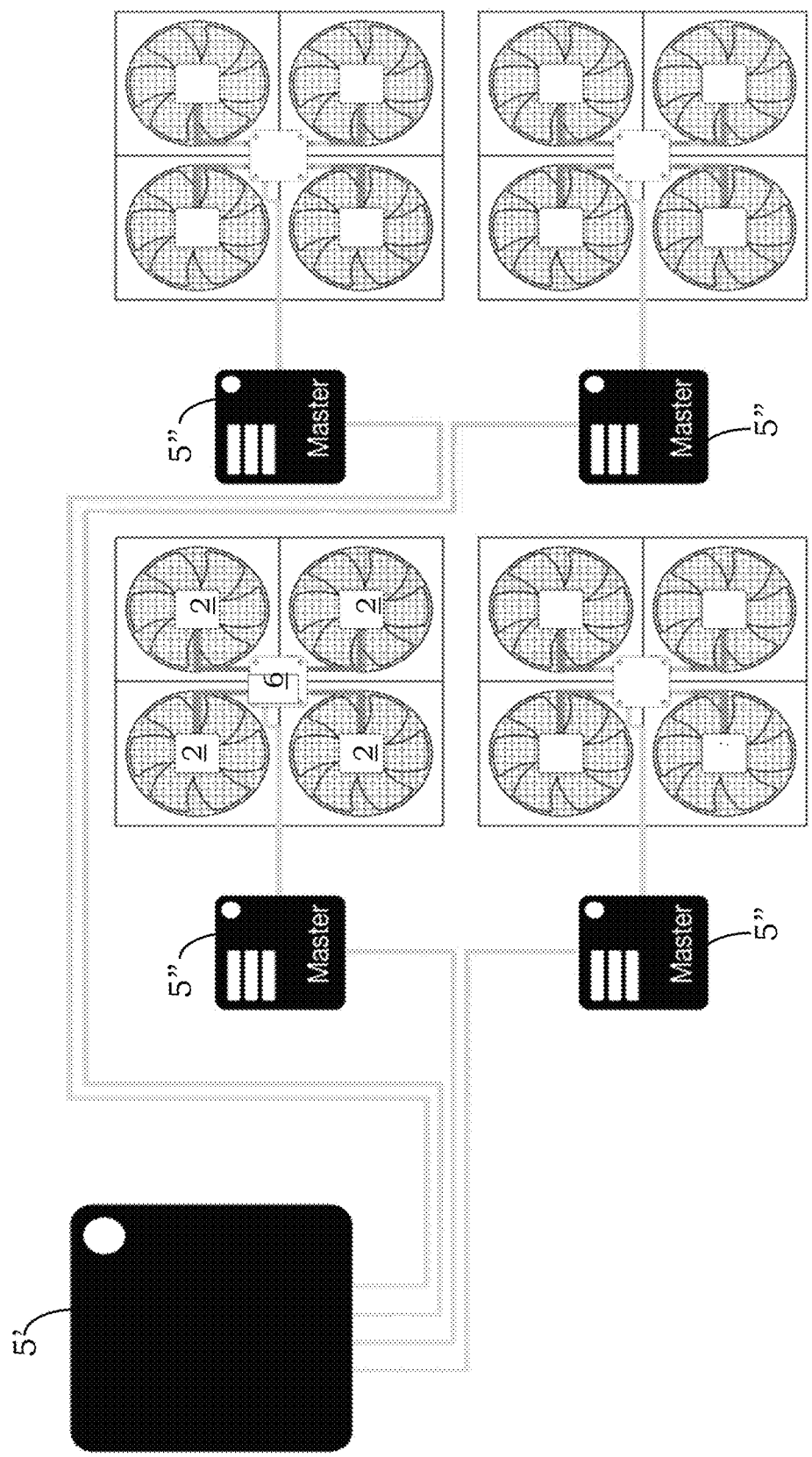

FIGS. 11A-11C show how the system of the present disclosure allows to perform any configuration and is arranged to also manage the Modbus star connection, simplifying all the activities necessary to the correct Modbus operation of an exchanger or its technical update, for instance with the replacement of the AC motors with EC motors of units already installed and operating, allowing the plug & play connection with a desired number of fans.

Summarizing what has been previously seen, thanks to the special management software and to the integrated ebm-papst e ziehl-abegg protocols, the system of the present disclosure automatically coordinates and manages the addressing and programming of EC motors and groups the information of the single EC motors, both to generate the final test report and for the remote control unit/Master unit. This allows effectively performing the Factory Test function, wherein the strong point is its functional simplicity.

In general, it can therefore be said that the system of the present disclosure is designed and studied for facilitating the management by the Master (which may communicate with the standard RTU Modbus protocol) of EC motors with proprietary Modbus protocols such as ebm-papst and ziehl-abegg protocols. In this way, the procedures are simplified, thus simplifying the programming and management of the single EC motors, the modularity of the electrical connections of the control auxiliaries, the automatic adjustment of the EC motors, the reading and acquisition of the operating data of the EC motors, including warnings and alarms, the collection and selection of the data package to be made available to the Master controller, as well as the remodelling of the 0-10 Vdc command to manage the ebm-papst and ziehl-abegg EC motors directly.

In general, an advantageous modular system for performing the wiring and for a plug & play Modbus management of machines with EC motors is described as an example.

Furthermore, the system of the present disclosure facilitates field service work, because, once an anomaly has been identified and reported, it allows the immediate replacement of the motors without the need for their prior programming, directly and automatically providing for the addressing and programming of the work parameters of the replaced devices, in addition to collecting all the information of the single EC motors in a data package for the final field-report.

The automatic programming of all the electric motors connected to the system of the present disclosure safeguards the safety of the operator in the testing procedures, guarantees the efficiency of the connections and the consequent effective programming of all of the connected EC motors.

The system of the present disclosure may also be easily applied with the retrofit function, since it facilitates the replacement of fans with AC motors of and already installed machines and, thanks to the modular plug-in connections and the Modbus protocols already integrated in the memory (i.e., in a dedicated software), it allows the complete management of the EC motors, also transforming the simple 0-10 Vdc regulation into Modbus. The disclosed plug & play system therefore allows retrofitting an existing system in a very simple and automatic way.

Furthermore, the drawback of the known solutions by which the Modbus specification requires the various devices to be connected in sequence is solved. This is no longer a problem for the system of the present disclosure. In the absence of the connection in sequence (Daisy-Chain) as required by the specification of the Modbus Standard, the system of the present disclosure allows solving the problems at the root thanks to the specific connection method (it is enough to connect the basic control units to the motors) and thanks to the specialized software for direct management of ebm-papst and ziehl-abegg EC motors. The system of the present disclosure allows the same connection to be maintained and transforms a criticality into a valid technically functional solution, thus being the ideal solution for exchangers with EC motors, also star-connected (see for instance FIG. 11C).

Still in accordance with the known solutions, it is known that each Master device has, for instance, a software limitation to manage up to 32 slave units whereas, for the Modbus numbering (ID), the usable addresses are from 1 to 247. On the other hand, the system of the present disclosure allows relaxing these constraints and, in addition to providing automatic addressing thanks to the instructions therein integrated that allow it to communicate automatically with the motors, it allows greater freedom in the design of the data communication architecture.

Furthermore, the system of the present disclosure is designed to collect data and information in relation to the set of motors, so as to act as a repository and to relieve the remote control unit/Master unit (for instance Master-BMS) from the direct management of EC motors, thus acting as a bridge. The system of the present disclosure is in fact able to acquire the information coming from the motors and report malfunctions in real time, interacting and preparing the information for the remote control unit/Master unit, transmitting it in the required mode. The system of the present disclosure is in fact in continuous communication with the electric motors and prepares the information for any request of the Master. For instance, through the remote control unit, malfunctions of the motors are acquired and reported, communicating them directly to the control system.

Finally, the system of the present disclosure is also able to perform a watchdog function, since an intrinsically safe device is provided, which checks the quality of the wiring and automatically monitors the levels of the command signals, immediately highlighting the anomalies and acquiring information on functional alarms. The system of the present disclosure therefore protects the correct operation of each connected motor, keeping the level of the transmitted Modbus signals constant. It guarantees the proper operation even in the event of technical-functional failures, isolating the defective fans and keeping the machine in working condition. Interruptions are therefore avoided, for instance in the event of faults in the connection with the motors, and the fan unit is kept operational.

It should also be noted that the system of the present disclosure safeguards the operator's safety in the testing procedures. In particular, the system of the present disclosure safeguards the operators' total electrical safety, since thanks to the integrated ebm-papst and ziehl-abegg protocols (updated to the latest version) it automatically performs all the identification and programming procedures of the EC motors.

FIGS. 12A-12D show various general cases of management architectures using the system of the present disclosure, summarizing some of the functions described above. Specifically, the system of the present disclosure adapts to all types of management and regulation systems: it interacts with remote management systems (for instance BMS, indicated as 5'), as well as with the Master on board the machine (i.e., local, indicated as 5", which may request for instance the reading of the motor data), or even with a combination of both. The examples of these figures may in fact be easily combined, thus obtaining a management system which is versatile and easily adaptable to any situation.

The system of the present disclosure stores and manages information on the EC motors of the fan system and simplifies the management and communication with the Master and/or with the remote BMS.

The system of the present disclosure may also be applied to the management and control of single-phase and three-phase AC motors, providing for instance support for ON/OFF regulation for a single or group of fans with AC motors, for proportional phase cut regulation (SCR), or proportional with Inverter, or with VAC voltage step unit, although the main application is for EC motors as illustrated above.

Finally, as initially anticipated, the versatility of the system of the present disclosure lends itself to various applications. In fact, the possibility of having a plurality of independent outputs (for instance four), equipped with independent hardware, as well as the possibility of being able to manage communication via software, for instance, using the Modbus protocols, allows managing a large number of apparatuses and electrical/electronic devices connected to the basic control unit.

For instance, it is possible to exploit the functionality of the system of the present disclosure and to create a system that transmits and receives information towards/from devices of different kinds and types, with a communication protocol that can be dedicated to single or multiple serial outputs/inputs.

Still more particularly, by way of non-limiting examples, the system may be applied to a refrigerator or to an industrial machine, to an application in home automation, where products of different types and brands coexist (such as for instance electric/electronic actuators), which report to a management system that receives, acquires, processes and transmits the information necessary for the management of a system of components and/or equipment, whether single and/or complex.

Figure 13:
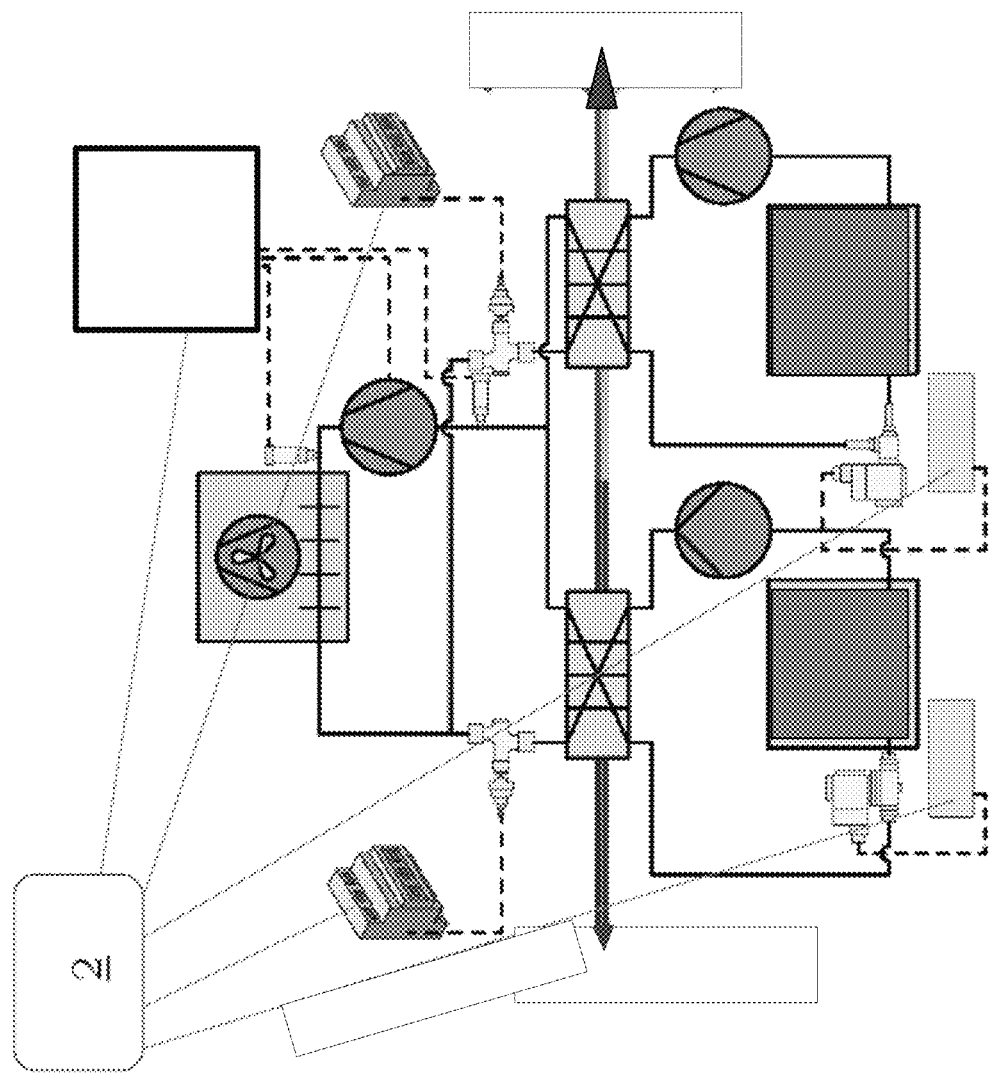
FIG. 13 schematically shows the application of the system of the present disclosure for controlling various electrical devices.

In an industrial refrigerator, there are in fact various electrical devices such as AC motors, EC motors, Inverters, valves, meters, sensors, electronic controls, all of which can be controlled by the system of the present disclosure, as well as circulators and pumps. FIG. 13 schematically shows how the basic control unit can be connected and configured to control various electrical devices that cooperate in a system (obviously the figure represents schematic ideal components, as well as the relating connections are inserted only by way of example).

From the foregoing it will be appreciated that, although specific embodiments of the disclosure have been described herein for purposes of illustration, various modifications may be made without deviating from the spirit and scope of the disclosure, all included in the protection scope as defined by the appended claims.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system for managing a set of electrical/electronic devices, comprising a basic control unit adapted to act as an interface between a remote control unit/Master unit and a plurality of electrical/electronic devices to be controlled, the basic control unit comprising:

a data input arranged to receive 0 to 10 Vdc inputs from the remote control unit/Master unit and a plurality of data outputs connectable with respective electrical/electronic devices of the plurality of electrical/electronic devices; and a memory unit including program instructions adapted to transform the inputs from the remote control unit/Master unit into management signals to be output through the data outputs for the plurality of electrical/electronic devices, wherein, by means of the management signals, the basic control unit is configured to:
  automatically address the electrical/electronic devices;
  automatically program operating parameters of the electrical/electronic devices; and
  manage the operation of the electrical/electronic devices, wherein the management signals comprise addressing, programming and management commands that are previously programmed in the memory unit based on specific applications and communication protocols, wherein the basic control unit is configured to make the program instructions activatable upon connection of the system with the remote control unit/Master unit for the addressing, programming and management operations, wherein the basic control unit is configured to manage each of the data outputs independently from the other data outputs, so as to manage the addressing, programming and management operations of each of the electrical/electronic devices automatically and independently, wherein, through the program instructions, the basic control unit is further configured to transform the 0 to 10 Vdc inputs so that the management signals emitted by the data outputs are based on one or more operating Modbus protocols for the communication with the electrical/electronic devices, the operating Modbus protocols being defined and stored based on the communication protocol of the electrical/electronic devices, wherein the basic control unit is configured to execute hardware and/or software commands and to automatically adapt hardware/software input into the proper operating Modbus protocol, and wherein the Modbus protocols are at least one of an ebm-papst protocol or a ziehl-abegg protocol, said protocol being selectable based on the electrical/electronic device to be managed.

2. The system of claim 1, wherein the basic control unit is a modular element interfaceable with other basic control units, each basic control unit being adapted to control a respective plurality of electrical/electronic devices, the system comprising a plurality of basic control units which form a set of modules connected to each other, each of the basic control units comprising an output and an input for the connection with the other modules.

3. The system of claim 1, wherein the electrical/electronic devices are EC motors.

4. The system of claim 3, wherein the management signals emitted by the data outputs comprise an analog voltage command from 0 to 10 Vdc, said command being at least adapted to adjust the rotational speed of the EC motors.

5. The system of claim 1, wherein the basic control unit is further configured to:
  read, by means of the data outputs, data from one or more of the electrical/electronic devices;
  use said data to generate an information package in relation to the operational status of the electrical/electronic devices; and
  make said information available for the remote control unit/Master unit.

6. The system of claim 1, wherein the basic control unit is configured to manage a warning system which includes at least one of a signalling LED, an alarm relay, and an alarm code signalling via the Modbus protocol.

7. The system of claim 1, comprising an auxiliary unit operatively connected to the basic control unit and configured at least to supply power to the basic control unit.

8. The system of claim 1, wherein the basic control unit comprises a casing enclosing electronic components of the system, the casing having an IP degree of protection from IP20 to IP55.

9. The system of claim 1, wherein the basic control unit is further configured to receive a power signal and to deliver said power signal to the electrical/electronic devices for the power supply thereof.

10. The system of claim 1, wherein said system further comprises cables for the connection of the basic control unit to the electrical/electronic devices, the cables being standardized and configured at least to carry the management signals.

11. The system of claim 10, wherein the basic control unit is further configured to check the correctness of the cable connections and arrangement.

12. The system of claim 1, wherein the operating Modbus protocols are stored in the memory unit of the basic control unit and are defined by the manufacturers of the electrical/electronic devices.

13. A ventilation system comprising:
  a set of fans;
  a plurality of EC motors adapted to drive the fans; and
  a system of claim 1 for managing the EC motors.

* * * * *